(12) United States Patent
Kurose

(10) Patent No.: US 10,063,477 B2
(45) Date of Patent: Aug. 28, 2018

(54) INFORMATION PROCESSING DEVICE, INFORMATION PROCESSING METHOD, AND RECORDING MEDIUM RECORDING INFORMATION PROCESSING PROGRAM

(71) Applicant: FUJITSU LIMITED, Kawasaki-shi, Kanagawa (JP)

(72) Inventor: Yoshitoshi Kurose, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 671 days.

(21) Appl. No.: 14/256,559

(22) Filed: Apr. 18, 2014

(65) Prior Publication Data

US 2014/0330971 A1   Nov. 6, 2014

(30) Foreign Application Priority Data

May 2, 2013  (JP) ................................ 2013-097099

(51) Int. Cl.
*G06F 15/16* (2006.01)
*H04L 12/70* (2013.01)

(52) U.S. Cl.
CPC ................... *H04L 47/00* (2013.01)

(58) Field of Classification Search
CPC ..................................................... H04L 47/00
See application file for complete search history.

(56) References Cited

U.S. PATENT DOCUMENTS

| | | | | |
|---|---|---|---|---|
| 5,727,157 A * | 3/1998 | Orr | ..................... | G06F 11/2257 709/223 |
| 6,580,715 B1 * | 6/2003 | Bare | ....................... | H04L 45/12 370/252 |
| 6,898,641 B1 | 5/2005 | Kobayashi | | |
| 6,930,983 B2 * | 8/2005 | Perkins | ............. | H04L 29/06027 370/252 |
| 7,149,815 B1 * | 12/2006 | Furukawa | ......... | H04L 29/12424 709/218 |
| 7,558,265 B2 * | 7/2009 | Andre | ..................... | H04L 29/06 370/242 |
| 8,125,988 B1 * | 2/2012 | Sullivan | .............. | H04L 29/0653 370/389 |
| 8,199,655 B2 * | 6/2012 | Kakadia | ................ | H04L 12/462 370/237 |
| 8,565,248 B2 * | 10/2013 | Le Faucheur | ....... | H04L 12/4641 370/229 |

(Continued)

FOREIGN PATENT DOCUMENTS

| | | |
|---|---|---|
| JP | 2001-292167 | 10/2001 |
| JP | 2010-220142 | 9/2010 |

*Primary Examiner* — Moustafa M Meky
*Assistant Examiner* — Andrea Hurst
(74) *Attorney, Agent, or Firm* — Fujitsu Patent Center

(57) ABSTRACT

An information processing device includes: an acquisition unit configured to acquire country information of one or a plurality of devices, which are positioned on a path to a destination of data, acquired from position information of the one or plurality of devices; and a determination unit configured to compare the country information acquired by the acquisition unit and information of countries in which passing of data is prohibited stored in a storage unit, determine whether a country in which passing of data is prohibited is included on the path, and if a country in which passing of data is prohibited is not included on the path, permit transmission of the data to the destination.

8 Claims, 17 Drawing Sheets

(56) References Cited

U.S. PATENT DOCUMENTS

| | | | | |
|---|---|---|---|---|
| 2004/0044791 A1* | 3/2004 | Pouzzner | ........... | G06F 17/22 709/245 |
| 2004/0208162 A1* | 10/2004 | Bergmann | ........... | H04L 45/22 370/351 |
| 2007/0153763 A1* | 7/2007 | Rampolla | ........... | H04L 41/0806 370/351 |
| 2009/0213840 A1* | 8/2009 | Furukawa | ........... | H04B 7/18582 370/352 |
| 2010/0013633 A1* | 1/2010 | Hazzani | ........... | H04W 4/02 340/540 |
| 2011/0212706 A1* | 9/2011 | Uusilehto | ........... | H04M 1/72572 455/411 |
| 2012/0166582 A1* | 6/2012 | Binder | ........... | H04L 63/18 709/217 |
| 2013/0142132 A1* | 6/2013 | Kim | ........... | H04W 72/0473 370/329 |
| 2013/0201928 A1* | 8/2013 | Kim | ........... | H04W 16/14 370/329 |
| 2014/0282844 A1* | 9/2014 | Devetter | ........... | H04L 63/20 726/1 |

* cited by examiner

FIG.4

POSITION INFORMATION CONVERSION TABLE

| COUNTY | GPS LATITUDE/LONGITUDE |
|---|---|
| COUNTY A | XA1-XA9, YA1-YA9 |
| COUNTY B | XB1-XB9, YB1-YB9 |
| COUNTY C | XC1-XC9, YC1-YC9 |
| COUNTY D | XD1-XD9, YD1-YD9 |
| .. | |

FIG.5

COUNTRY PATH CHART

| NUMBER | IP ADDRESS | GPS LATITUDE/LONGITUDE | COUNTRY | DESTINATION IP ADDRESS |
|---|---|---|---|---|
| 1 | 10.1.1.1 | XA, YA | COUNTRY A | 5.1.1.1 |
| 2 | 20.1.1.1 | XB, YB | COUNTRY B | 5.1.1.1 |
| | | | | |

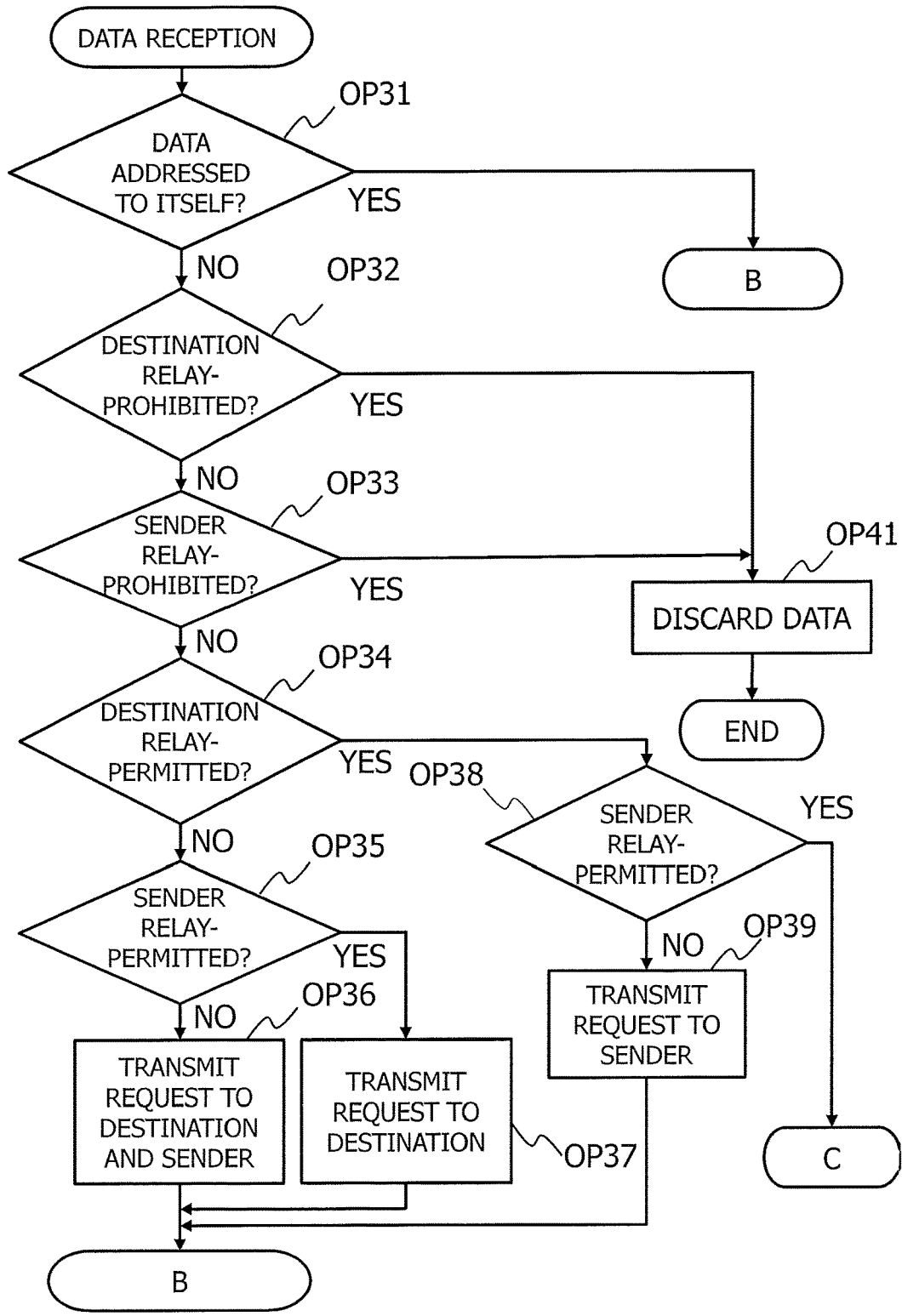

INFORMATION PROCESSING DEVICE, INFORMATION PROCESSING METHOD, AND RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2013-097099, filed on May 2, 2013, the entire contents of which are incorporated herein by reference.

FIELD

The present invention relates to an information processing device, an information processing method, and a recording medium recording an information processing program for transmitting or relaying data.

BACKGROUND

Along with the globalization of network, there is data transmission to destinations belonging to different nations or data transmission through different nations. Like import and export of goods, there are regulations in the transmission and relay of data depending on international affairs and the like. For example, when a country C receives data from a country A through a country B, there is a regulation that the country A prohibits passing of data to the country B or that the country B prohibits relay of data from the country A.

PATENT DOCUMENT

[Patent document 1] Japanese Patent Laid-Open No. 2001-292167
[Patent document 2] Japanese Patent Laid-Open No. 2010-220142

SUMMARY

An aspect of the present invention provides an information processing device including:
  an acquisition unit configured to acquire country information of one or a plurality of devices, which are positioned on a path to a destination of data, acquired from position information of the one or plurality of devices; and
  a determination unit configured to compare the country information acquired by the acquisition unit and information of countries in which passing of data is prohibited stored in a storage unit, determine whether a country in which passing of data is prohibited is included on the path, and when a country in which passing of data is prohibited is not included on the path, permit transmission to the destination.

Another aspect of the present invention provides an information processing method by the information processing device executing the process described above. Furthermore, another aspect of the present invention can include a program causing a computer to function as the information processing device and a computer-readable non-transitory recording medium recording the program. The non-transitory recording medium that can be read by a computer and the like is a recording medium that can accumulate information, such as data and programs, by electrical, magnetic, optical, mechanical, or chemical actions and that can be read from a computer and the like.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 4 is an example of a position information conversion table;
FIG. 5 is an example of a country path chart;
FIG. 13A is an example of a flow chart of a process of the relay device according to the second embodiment.

DESCRIPTION OF EMBODIMENTS

Hereinafter, embodiments of the present invention will be described based on the drawings. The following configurations of the embodiments are illustrative, and the present invention is not limited to the configurations of the embodiments.

<First Embodiment>

Figure 1:
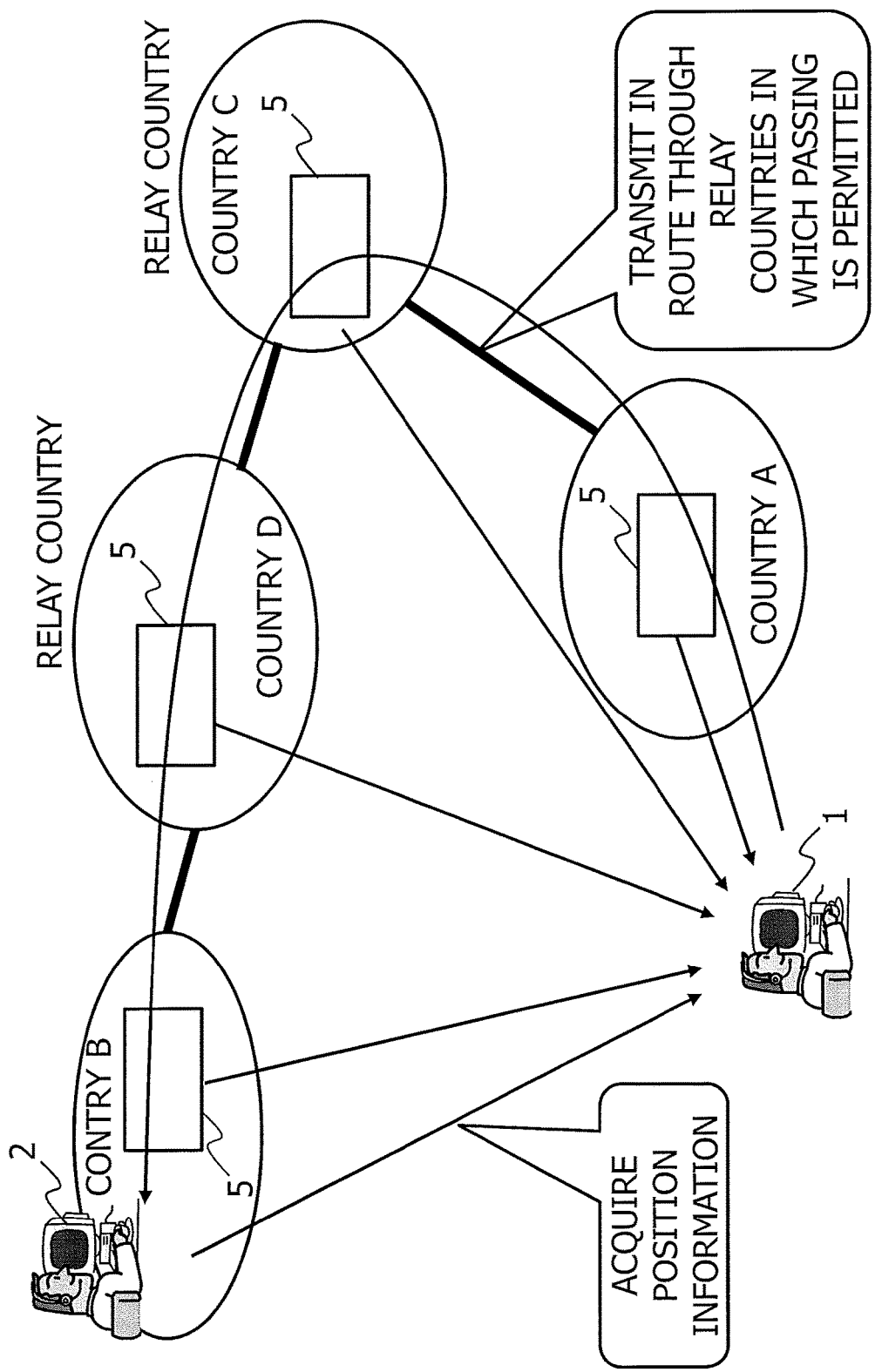
FIG. 1 is a diagram illustrating an example of a network system according to a first embodiment.

FIG. 1 is a diagram illustrating an example of a network system according to a first embodiment. In the first embodiment, an information processing device 1 is, for example, a terminal device, such as a personal computer, a mobile phone terminal, a tablet terminal, and a smartphone. However, the information processing device is not limited to the terminal device, and the information processing device also includes a relay device.

In the network system illustrated in FIG. 1, when the information processing device 1 belonging to a country A transmits data to an information processing device 2 belonging to a country B, the data is transmitted by a path going through relay devices 5 belonging to the country A, a country C, a country D, and the country B. The path from the information processing device 1 to the information processing device 2 is, for example, statically determined in advance or dynamically determined by a routing protocol or the like.

Before the transmission of data, the information processing device 1 collects position information of the devices from the relay devices 5 on the path to the destination and from the information processing device 2 of the destination. The position information is, for example, latitude and longitude acquired by GPS and is a serial number, an address, and the like of a base station to be connected when the relay device is a wireless station.

The position information is collected, for example, by using a protocol that can collect path information, such as RSVP (Resource Reservation Protocol), trace-route, and BGP (Border Gateway Protocol). In the first embodiment, the information processing device 1 transmits a position confirmation request with the information processing device 2 as the destination, which is the destination of data, and the relay devices 5 and the information processing device 2 return position information data including the position information to the information processing device 1 in response to the position confirmation request.

The relay devices 5 that relay the position confirmation request forward the position confirmation request and transmit the position information data to the information processing device 1 that is the sender of the position confirmation request. In this case, the destination of the position confirmation request is set for the sender of the position information data. Furthermore, IP addresses of the relay devices 5 are included in the position information data as creators of the position information data.

The information processing device 1 acquires the countries of the relay devices 5 and the information processing device 2 of the destination from the collected position information. The information processing device 1 compares the countries of the relay devices 5 on the path as well as the country of the information processing device 2 with a black list and determines whether there is an device on the path that belongs to a country included in the black list. The black list is a list of countries for which the country of the information processing device 1 prohibits passing of data transmitted from the country of the information processing device 1.

If there is no device on the path that belongs to the countries in the black list, the information processing device 1 permits the data transmission to the information processing device 2 that is the destination of the data to be transmitted. On the other hand, if there is an device on the path that belongs to a country included in the black list, the information processing device 1 prohibits the data transmission to the information processing device 2 that is the destination of the data to be transmitted.

The information processing device 1 acquires the information of the countries of the devices on the path of the data transmission and determines whether the path does not go through the countries, in which passing of data is prohibited, to thereby be able to control the data transmission such that the data does not go through the countries, in which passing of data is prohibited.

The countries of the devices are not limited to the geographic positions of the devices. The countries of the devices may be determined by countries of managers of the devices, that is, by virtual management boundaries. For the convenience, it is assumed that the countries of the devices are determined by the geographic positions of the devices in the description of the first embodiment.

Hereinafter, the fact that a device belonging to a country included in the black list is/is not on the path will also be expressed as a country included in the black list is/is not on the path or expressed as data passes/does not pass through a country included in the black list. Furthermore, the relay devices 5, the information processing device 2, and the like will also be generally called "devices".

<Configuration of Information Processing Device>

Figure 2:
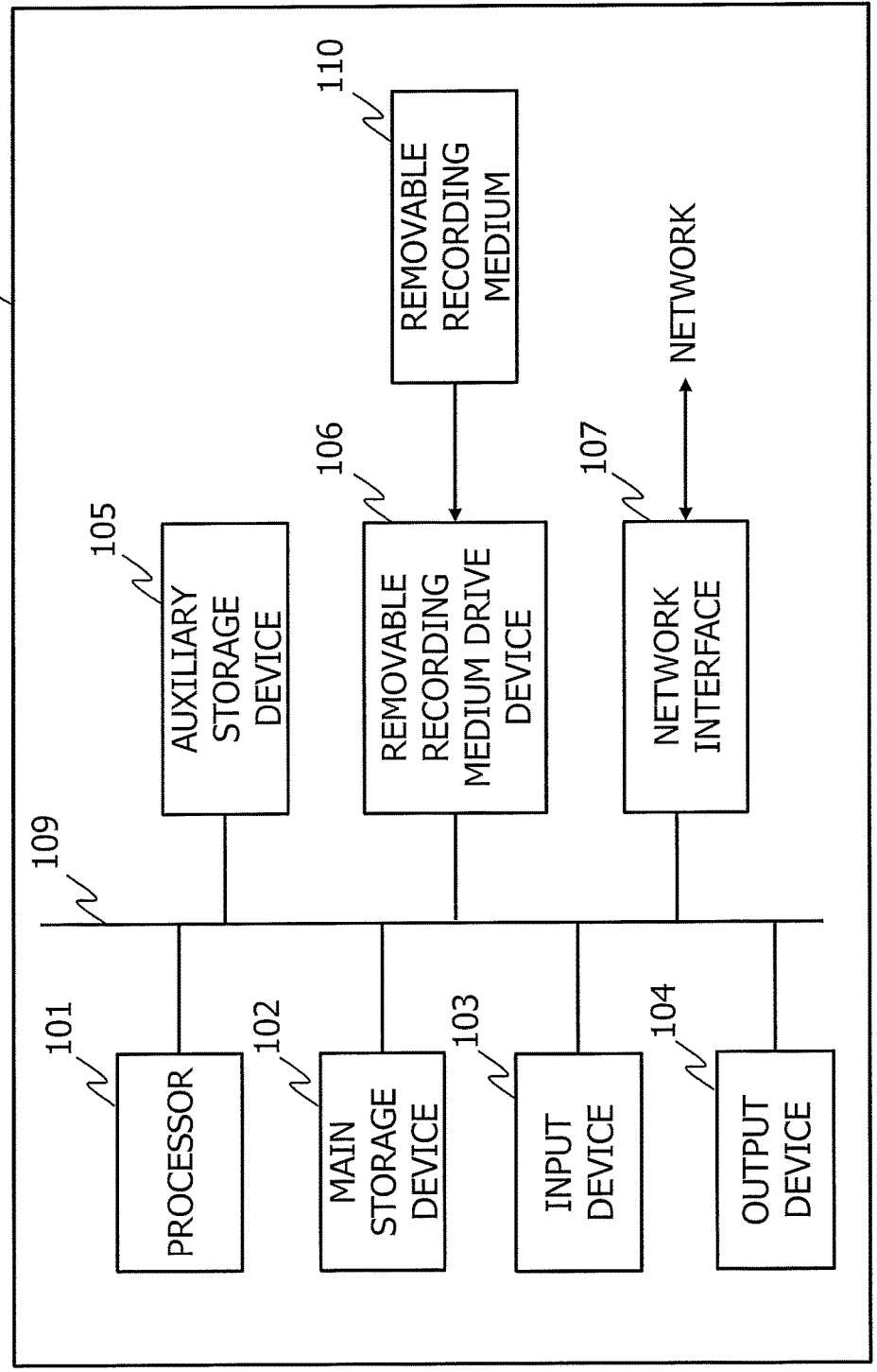
FIG. 2 is a diagram illustrating an example of a hardware configuration of an information processing device.

FIG. 2 is a diagram illustrating an example of a hardware configuration of the information processing device 1. The information processing device 1 includes a processor 101, a main storage device 102, an input device 103, an output device 104, an auxiliary storage device 105, a removable recording medium drive device 106, and a network interface 107. These are connected to each other by a bus 109.

The input device 103 is, for example, a keyboard, a pointing device such as a mouse, a touch panel, and the like. Data input from the input device 103 is output to the processor 101.

The removable recording medium drive device 106 reads programs and various data recorded in the removable recording medium 110 and outputs to the processor 101. The removable recording medium 110 is, for example, a recording medium, such as an SD card, a miniSD card, a microSD card, a USB (Universal Serial Bus) flash memory, a CD (Compact Disc), a DVD (Digital Versatile Disc), a Blu-ray Disc, and a flash memory card.

The network interface 107 is an interface for inputting and outputting information to and from the network. The network interface 107 includes an interface for connection to a wired network and an interface for connection to a wireless network. The network interface 107 is, for example, a NIC (Network Interface Card), a wireless LAN (Local Area Network) card, or the like. If the information processing device 1 is a mobile phone terminal, a smartphone, or the like for wireless communication, the network interface 107 includes an antenna, a wireless signal processing circuit, and the like. Data and the like received by the network interface 107 are output to the processor 101.

The auxiliary storage device 105 stores various programs as well as data used by the processor 101 in the execution of the programs. The auxiliary storage device 105 is, for example, a non-volatile memory, such as an EPROM (Erasable Programmable ROM) and a hard disk drive. The auxiliary storage device 105 holds, for example, an operating system (OS), a data transmission control program, and various other application programs.

The main storage device 102 provides the processor 101 with a storage area and a work area for loading a program stored in the auxiliary storage device 105, and the main storage device 102 is used as a buffer. The main storage device 102 is, for example, a semiconductor memory, such as a RAM (Random Access Memory).

The processor 101 is, for example, a CPU (Central Processing Unit). The processor 101 executes various processes by loading, on the main storage device 102, the OS and various application programs held by the auxiliary storage device 105 or the removable recording medium 110 and executing the OS and various application programs. The number of the processor 101 is not limited to one, and a plurality of processors 101 may be included.

The output device 104 outputs results of the processes of the processor 101. The output device 104 includes, for example, a display, a printer, and an audio output device such as a speaker.

For example, the processor 101 loads, on the main storage device 102, a data transmission control program held by the auxiliary storage device 105, and the information processing device 1 executes the data transmission control program. Through the execution of the data transmission control program, the information processing device 1 acquires the position information and the country information of the devices on the path of data and determines availability of the data transmission based on the country information and the black list. The hardware configuration of the information processing device 1 is an example and is not limited to the configuration described above. Constituent elements can be appropriately omitted, replaced, or added according to an embodiment. The data transmission control program may be recorded, for example, in the removable recording medium 110. The data transmission control program is an example of the "information processing program".

Figure 3:
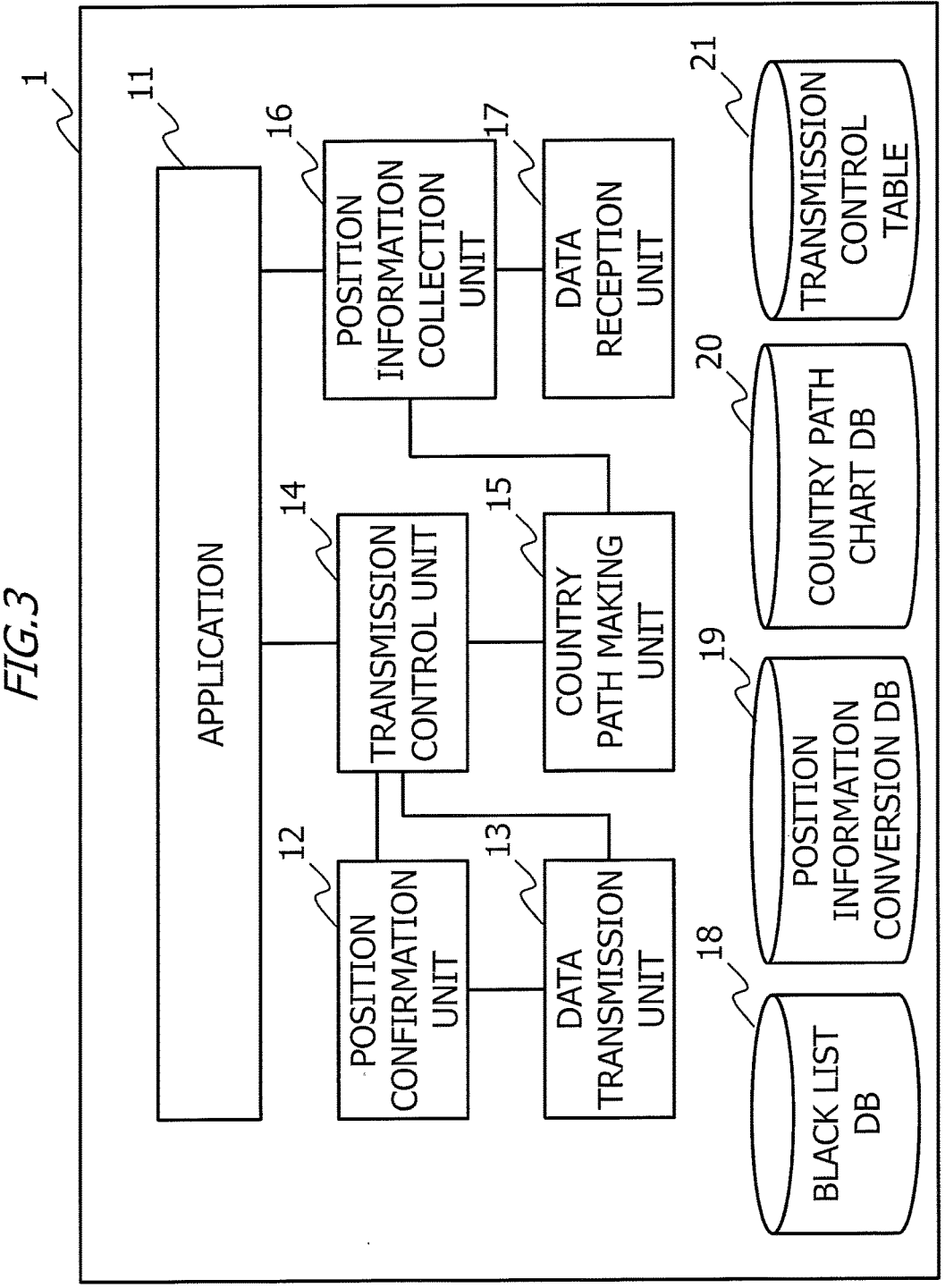
FIG. 3 is a diagram illustrating an example of functional blocks of the information processing device according to the first embodiment.

FIG. 3 is a diagram illustrating an example of functional blocks of the information processing device 1 according to the first embodiment. The information processing device 1 includes functional blocks, such as an application 11, a position confirmation unit 12, a data transmission unit 13, a transmission control unit 14, a country path making unit 15, a position information collection unit 16, a data reception unit 17, a black list database (DB) 18, a position information conversion DB 19, a country path chart DB 20, and a transmission control table 21.

The processor 101 executes processes of the position confirmation unit 12, the data transmission unit 13, the transmission control unit 14, the country path making unit 15, the position information collection unit 16, and the data reception unit 17 through the execution of the data transmission control program. The black list database (DB) 18, the position information conversion DB 19, the country path chart DB 20, and the transmission control table 21 are statically created in advance or created through the execution of the data transmission control program, in a storage area of the auxiliary storage device 105. However, although the information processing device 1 includes the black list DB 18 and the position information conversion DB 19 in the first embodiment, the black list DB 18 and the position information conversion DB 19 may be independent external devices different from each other.

The data transmission unit 13 and the data reception unit 17 are interfaces of data transmission and reception, respectively.

In response to an instruction of data transmission from the application 11, the transmission control unit 14 determines the availability of the data transmission to the destination of the data to be transmitted. The result of the availability determination of the data transmission to the destination of the data to be transmitted is stored for a predetermined time in the transmission control table 21 (described later). When the instruction of the data transmission from the application is received, the transmission control unit 14 refers to the transmission control table 21 and acquires the availability of the data transmission to the destination to thereby perform the availability determination of the data transmission to the destination.

If the result of the availability determination of the data transmission to the destination is not stored in the transmission control table 21, the transmission control unit 14 instructs the position confirmation unit 12 for position information collection of the devices positioned on the path to the destination of the data to be transmitted. Based on the country information of the devices on the path to the destination of the data to be transmitted acquired by the position confirmation unit 12, the position information collection unit 16, and the country path making unit 15 (they will be described later), the transmission control unit 14 performs the availability determination of the data transmission to the destination of the data to be transmitted. The transmission control unit 14 is an example of the "determination unit".

In response to the instruction from the transmission control unit 14, the position confirmation unit 12 transmits a position confirmation request to the destination of the data to be transmitted. The position confirmation request is, for example, a packet of a protocol, such as RSVP, BGP, and trace-route.

The position information collection unit 16 extracts position information data, which is a response to the position confirmation request, from the reception data of the data reception unit 17 and outputs the position information data to the country path making unit 15. The position information data is data returned from the devices on the path to the information processing device 1 as a response to the position confirmation request transmitted from the position confirmation unit 12. The position information data includes, for example, the IP address and the position information of the device of the creator position information data. The position information is, for example, information of the latitude/longitude of the GPS, the sequence number of the base station, the address, and the like. In the first embodiment, it is assumed that each device uses the latitude/longitude of the GPS as the position information, for the convenience. Since the position information data is a response to the position confirmation request, the position information collection unit 16 determines the position information data from the reception data based on, for example, the protocol number and the sequence number in the IP header. The position information collection unit 16 is an example of the "collection unit".

In response to the input of the position information data from the position information collection unit 16, the country path making unit 15 acquires the country information of the devices from the position information and acquires country information of the devices on the path to the destination of the data to be transmitted. The country information acquired by the country path making unit 15 from the position information data is stored in a country path chart (described later). The country path making unit 15 is an example of the "acquisition unit".

The black list DB 18 stores the black list. The black list is a list of countries for which the country of the information processing device 1 prohibits passing of data. One or a plurality of black lists may be stored in the black list DB 18. The black list DB 18 is an example of the "storage unit".

FIG. 4 is an example of a position information conversion table. The position information conversion table is stored in the position information conversion DB 19. The position information conversion table is a table indicating a correspondence between the position information and the countries. In the first embodiment, since each device is designed to use the information of the latitude/longitude obtained from the GPS as the position information, the correspondence between the latitude/longitude obtained from the GPS and the countries is stored in the position information conversion table. The "COUNTRY" of the position information conversion table is not limited to the country name, and a code indicating the country may be stored.

The country path making unit 15 uses the position information conversion table to acquire the country information corresponding to the position information of the devices.

If the position information from the devices is serial numbers of the base stations, an association between the countries and the serial numbers of the base stations or an association between the serial numbers, the positions of the base stations, and the countries is stored in the position information conversion table, for example. If, for example, a plurality of types of information, such as the latitude/longitude obtained from the GPS and the serial number of the wireless base station, is used as the position information, the position information conversion table is prepared for each type. The position information conversion DB 19 is an example of the "correspondence storage unit".

FIG. 5 is an example of a country path chart. The country path chart is stored in the country path chart DB 20, for example, from the creation to a lapse of a predetermined time. The predetermined time is determined by the manager in minutes, hours, or days. The country path making unit 15 makes the country path chart for each destination of data.

The country path chart is made by the country path making unit 15 based on the position information data, which is a response to the position confirmation request. The country path chart illustrated in FIG. 5 includes an association between numbers, IP addresses of the creators of the position information data ("IP ADDRESS" in FIG. 5), latitude/longitude obtained by the GPS ("GPS LATITUDE/LONGITUDE" in FIG. 5), countries corresponding to the latitude/longitude ("COUNTRY" in FIG. 5), and IP addresses of the destinations of the data that triggered the transmission of the position confirmation request ("DESTINATION IP ADDRESS" in FIG. 5). The IP address of the destination of the data that triggered the transmission of the position confirmation request is the source IP address of the position information data in the first embodiment. This is because in the first embodiment, the position confirmation request is transmitted with the destination IP address of the data to be transmitted as the destination IP address of the position confirmation request, and each device transmits the position information data with the destination IP address of the position confirmation request as the source IP address of the position information data, which is a response to the position confirmation request.

The numbers included in the country path chart indicate an order of the reception of the position information data by the information processing device 1. When the network is normal, since the information processing device 1 receives the position information data from the devices in ascending order of distance from the information processing device 1, the numbers included in the country path chart often indicate the order of devices to the destination. However, in the first embodiment, since it is sufficient to specify the countries that the data passes through before the data reaches the destination of the data to be transmitted, the numbers included in the country path chart may not indicate an accurate order of data passing through.

In the first embodiment, since the position information data returned from the devices does not include the country information, the countries corresponding to the position information data acquired by the country path making unit 15 using the position information conversion table is stored in the "COUNTRY" of the country path chart. As in the position information conversion table, the "COUNTRY" of the country path chart is not limited to the country information, and codes indicating the countries may be stored.

The transmission control unit 14 compares the country path chart and the black list to determine whether there is a country, in which passing of data is prohibited, on the path to the destination of the data to be transmitted. The country path chart is deleted from the country path chart DB 20 by the country path making unit 15 when a predetermined time has passed from the creation, for example.

The transmission control table 21 includes IP addresses and availability of data transmission to the IP addresses determined by the transmission control unit 14. The record of the transmission control table 21 is deleted by the transmission control unit 14 when a predetermined time has passed from the creation. The transmission control table 21 may also include a record set by the manager, in addition to the result of the availability determination of the data transmission by the transmission control unit 14. The record set by the manager is not deleted after a lapse of the predetermined time. The transmission control table 21 is an example of the "holding unit".

The predetermined times for holding the country path chart and for holding the record of the transmission control table 21 of the IP addresses corresponding to the country path chart may be the same. By holding the country path chart and the record of the transmission control table 21 for the predetermined time, the processes of transmitting the position confirmation request, receiving the position information data, creating the country path chart, and the like are skipped for the destination for the predetermined time, and the load imposed on the information processing device 1 and the network is reduced. The predetermined time is set to a time in which it is assumed that the path to the destination of the data to be transmitted is not changed.

<Flow of Process>

Figure 6:
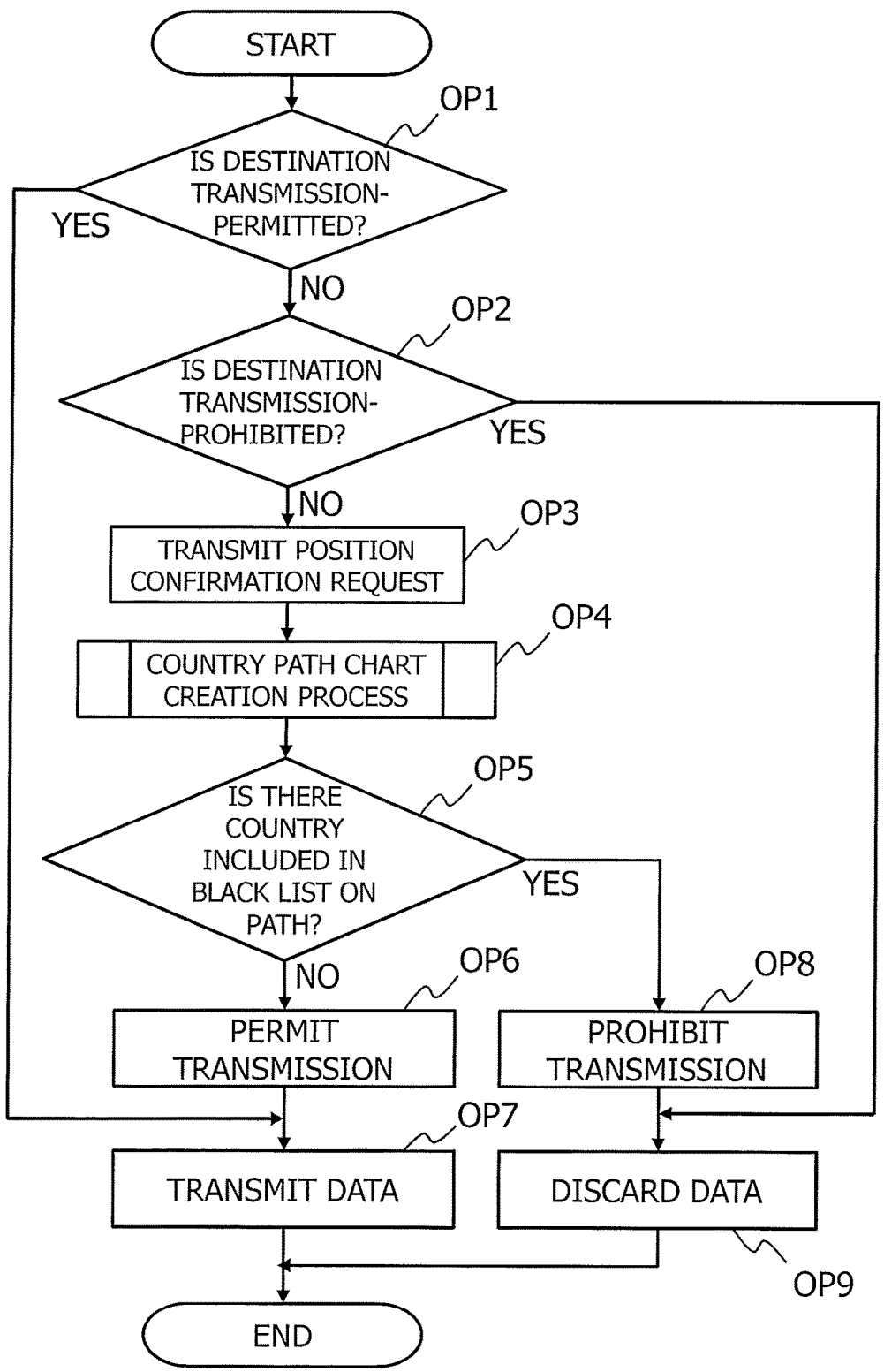
FIG. 6 is an example of a flow chart of a process of the information processing device according to the first embodiment.

FIG. 6 is an example of a flow chart of a process of the information processing device 1 according to the first embodiment. The flow chart illustrated in FIG. 6 is started when, for example, an instruction of data transmission from the application 11 is input.

OP1 and OP2 are a process of determining whether the availability of the data transmission to the destination of the data to be transmitted is stored in the transmission control table 21. In OP1 and OP2, the transmission control unit 14 refers to the transmission control table 21 to determine whether the destination of the data to be transmitted is set to transmission-permitted or transmission-prohibited. If the destination of the data to be transmitted is set to transmission-permitted (OP1: YES), the process proceeds to OP7. In OP7, the data to be transmitted is transmitted through the data transmission unit 13.

If the destination of the data to be transmitted is set to transmission-prohibited (OP2: YES), the transmission control unit 14 determines the transmission prohibition of the data to be transmitted, and the process proceeds to OP9. In OP9, the transmission control unit 14 discards the data to be transmitted.

If the destination of the data to be transmitted is not set to transmission-permitted or transmission-prohibited, that is, if the record of the destination of the data to be transmitted does not exist in the transmission control table 21 (OP1: NO, OP2: NO), the process proceeds to OP3.

In OP3, since the record of the destination of the data to be transmitted does not exist in the transmission control table 21, the transmission control unit 14 instructs the position confirmation unit 12 to transmit the position confirmation request. The position confirmation unit 12 sets the destination IP address of the data to be transmitted as the destination IP address of the position confirmation request and transmits the position confirmation request. The position confirmation request passes through the path to the destination IP address statically determined in advance or dynamically determined by the routing protocol or the like. When the relay devices 5 on the path receive the position confirmation request, the relay devices 5 forward the position confirmation request to the destination IP address and return the position information data to the information processing device 1 that is the sender of the position confirmation request. Next, the process proceeds to OP4.

OP4 is a country path chart making process by the country path making unit 15 using the position information data received from the devices. Details of the country path making process will be described later. When the country path chart is made, the process proceeds to OP5.

OP5, OP6, and OP8 are a process of the availability determination of the data transmission to the destination of the data to be transmitted. In OP5, the transmission control unit 14 compares the country path chart and the black list to determine whether there is a country included in the black list on the path to the destination of the data to be transmitted.

If there is no country included in the black list on the path to the destination of the data to be transmitted (OP5: NO), the process proceeds to OP6, and the transmission control unit 14 determines permission of the data transmission to the destination. The transmission control unit 14 stores the permission of the data transmission to the destination in the transmission control table 21. Subsequently, the process proceeds to OP7, and the data transmission unit 13 transmits the data to the destination. The process illustrated in FIG. 6 ends with the completion of the transmission of the data.

If there is a country included in the black list on the path to the destination of the data to be transmitted (OP5: YES), the process proceeds to OP8, and the transmission control unit 14 determines prohibition of the data transmission to the destination. The transmission control unit 14 stores the prohibition of the data transmission to the destination in the transmission control table 21. Subsequently, the process proceeds to OP9, and the transmission control unit 14 discards the data to be transmitted. The process illustrated in FIG. 6 ends with the completion of the discard of the data.

Figure 7:
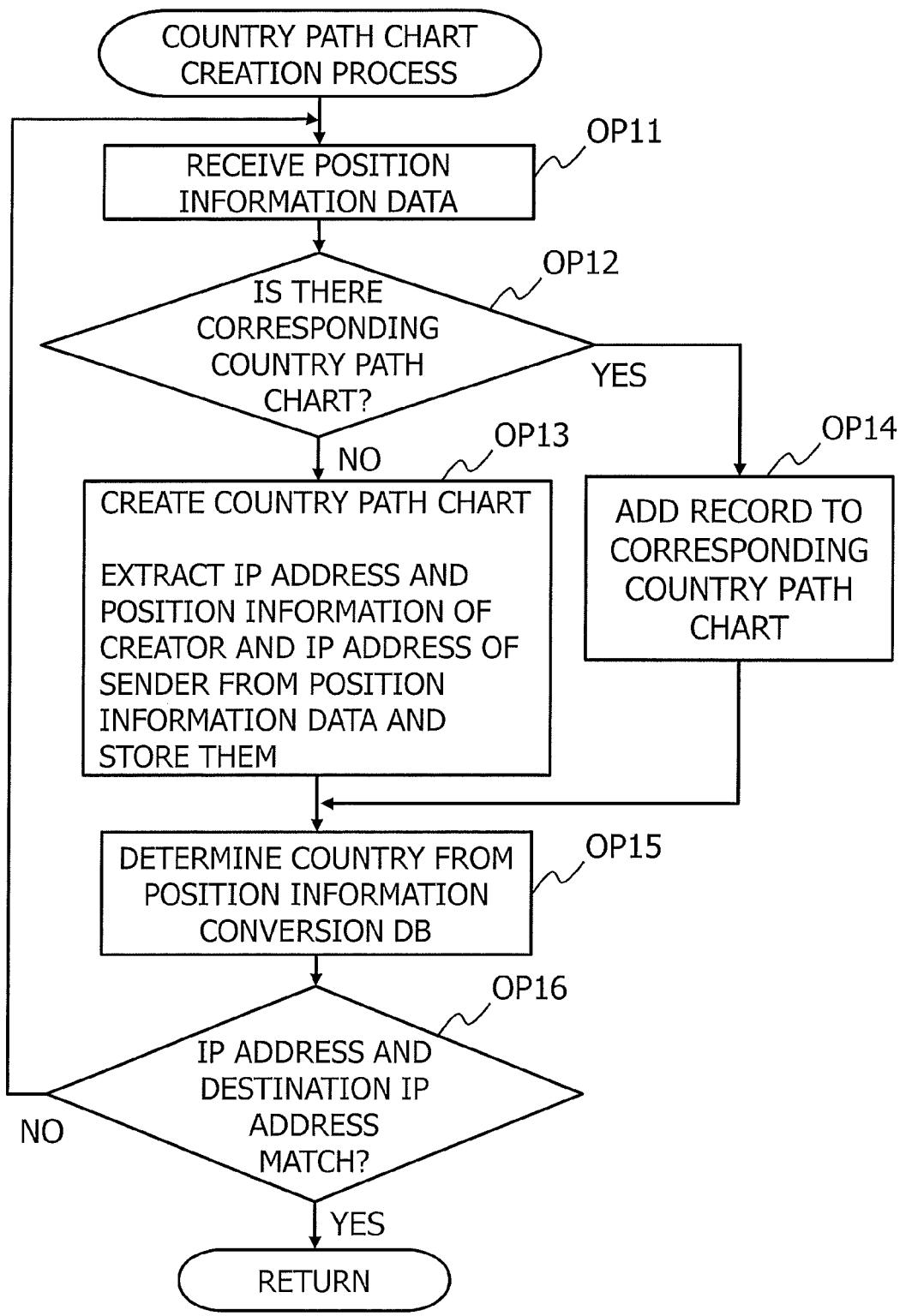
FIG. 7 is an example of a flow chart of a country path chart making process.

FIG. 7 is an example of a flow chart of a country path chart making process. In OP11, the position information collection unit 16 receives the position information data, which is a response to the position confirmation request transmitted by the position confirmation unit 12 in OP3 of FIG. 6, from one of the devices on the path and outputs the position information data to the country path making unit 15. Next, the process proceeds to OP12.

In OP12, the country path making unit 15 confirms the presence of the country path chart corresponding to the source IP address of the position information data. The source IP address of the position information data is the destination IP address of the position confirmation request, that is, the destination of the data to be transmitted. If there is no country path chart corresponding to the source IP address of the position information data (OP12: NO), the process proceeds to OP13, and in OP13, the country path making unit 15 newly makes a country path chart corresponding to the destination IP address of the data to be transmitted. If there is a country path chart corresponding to the source IP address of the position information data (OP12: YES), the process proceeds to OP14, and the country path making unit 15 adds the record to the corresponding country path chart in OP14.

In OP13 and OP14, the country path making unit 15 extracts the position information, the IP address of the creator of the position information data, and the source IP address of the position information data from the position information data and stores them in the country path chart (see FIG. 5). Next, the process proceeds to OP15.

In OP15, the country path making unit 15 acquires the country information corresponding to the position information from the position information conversion DB 19 and stores the country information in the country path chart. Next, the process proceeds to OP16.

In OP16, the country path making unit 15 determines whether the IP address of the creator of the position information data and the source IP address ("destination IP address") of the position information data match in the target record in OP13 or OP14. The matching of the two IP addresses indicates that the position information data is a response from the destination of the data to be transmitted. Since the destination of the data to be transmitted is an device farthest on the path, the return of the position information data from the destination of the data to be transmitted indicates the end of the making of the country path chart for the destination.

In the target record in OP13 or OP14, if the IP address of the creator of the position information data and the source IP address of the position information data match (OP16: YES), the making of the country path chart for the destination of the data to be transmitted ends, and the process proceeds to OP5 of FIG. 6. In the target record in OP13 or OP14, if the IP address of the creator of the position information data and the source IP address of the position information data do not match (OP16: NO), the process returns to OP11.

The process illustrated in FIGS. 6 and 7 is an example, and the order may be appropriately switched, omitted, or added.

<Configuration of Relay Device>

Figure 8:
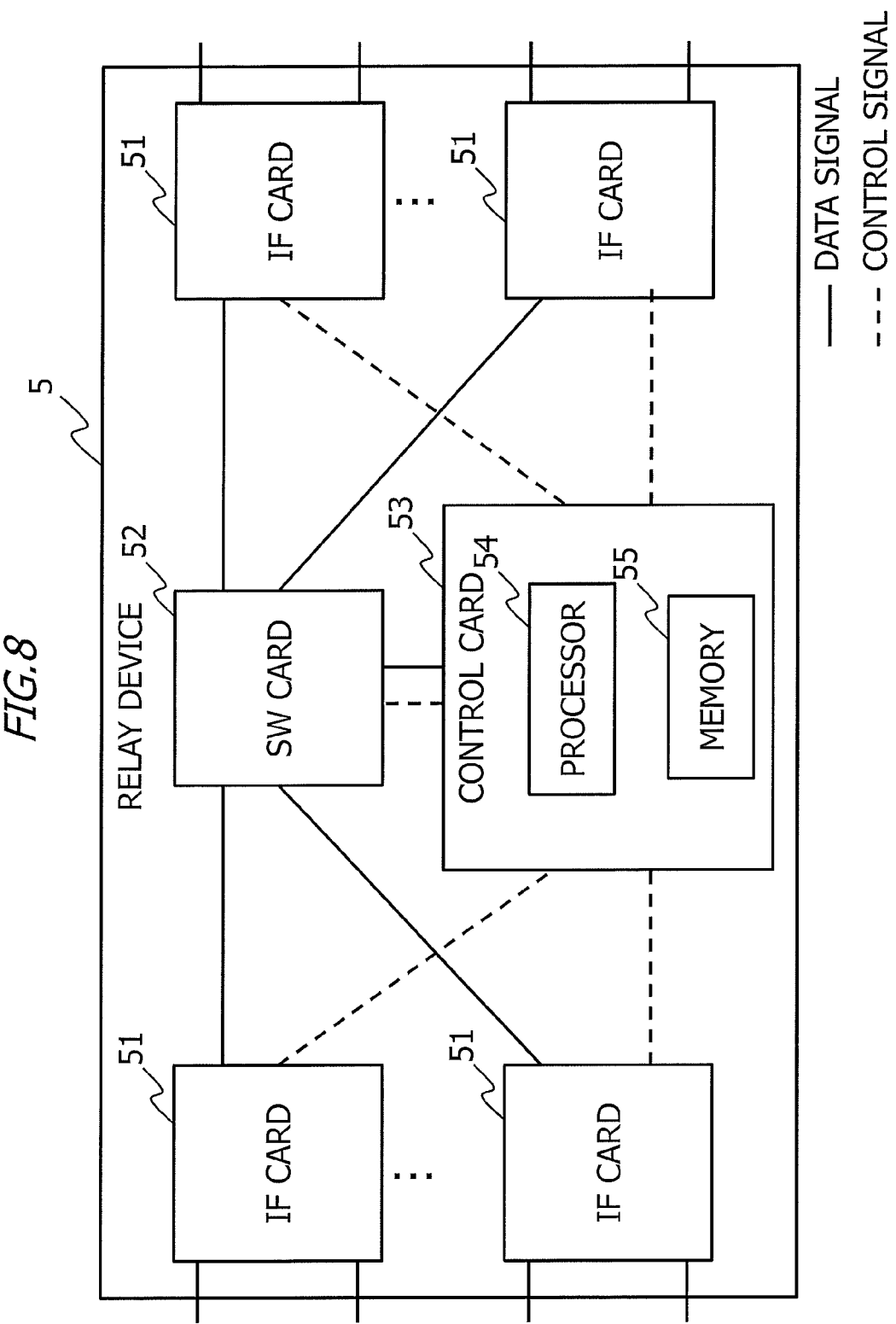
FIG. 8 is a diagram illustrating an example of a hardware configuration of a relay device.

FIG. 8 is a diagram illustrating an example of a hardware configuration of the relay device 5. The relay device 5 is, for example, an device such as an edge router of one carrier. The relay device 5 includes: a plurality of IF cards 51; an SW card 52 that relays packets between the IF cards 51; and a control card 53 that controls the cards of the relay device 5. Although partially not illustrated, each of the IF cards 51, the SW card 52, and the control card 53 includes one or a plurality of processors and memories.

The IF cards 51 apply termination processing of physical layer and MAC (Media Access Control) layer to the data input to the relay device 5, and the data is transferred to the SW card 2. The SW card 2 relays the input data to the IF card 51 corresponding to the destination. In this case, predetermined data, such as data addressed to the relay device 5 and a position confirmation request in which the destination is other than the relay device 5, is forwarded to the control card 53. The IF card 51 applies termination processing of physical layer and MAC layer to the data forwarded to one of the IF cards 51, and the data is output to the network.

A memory 55 of the control card 53 includes, for example, a volatile memory, such as an SRAM (Static Random Access Memory) and a DRAM (Dynamic Random Access Memory), and a non-volatile memory, such as a PROM (Programmable Read Only Memory). The memory 55 stores various programs and data.

The processor 54 of the control card 53 is, for example, a CPU. The processor 54 executes a program stored in the memory 55 to forward the position confirmation request to the destination when the position confirmation request transmitted from the information processing device 1 is received and returns the position information data of the device to the sender of the position confirmation request in response to the position confirmation request.

The hardware configuration of the relay device 5 is not limited to the one illustrated in FIG. 8, and addition, deletion, and replacement may be appropriately performed. Usually, the processing target of the relay device 5 is packets, and when the relay device 5 is the destination or the sender, the control card 53 executes a process of assembly of data from packets or a process of fragmentation from data to packets. However, this process of the relay device is a well-known process, and the description is omitted in the present specification. Hereinafter, in the present specification, the processing target of the relay device 5 may be described as "data", for the convenience.

Figure 9:
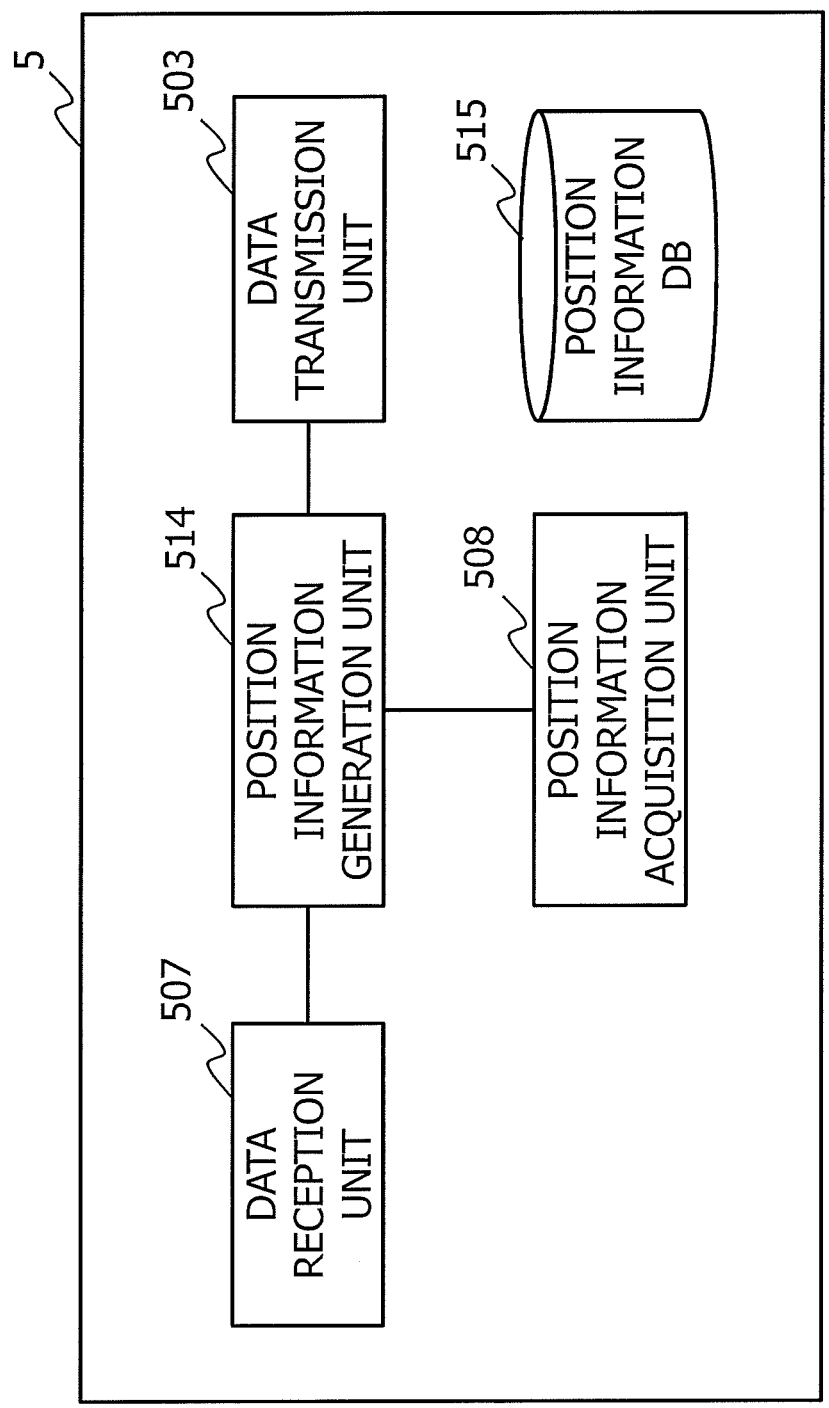
FIG. 9 is an example of a functional block diagram of the relay device.

FIG. 9 is an example of a functional block diagram of the relay device 5. The relay device 5 includes functional blocks, such as a data reception unit 507, a position information generation unit 514, a position information acquisition unit 508, a data transmission unit 503, and a position information DB 515. The data reception unit 507 and the data transmission unit 503 are equivalent to, for example, the IF card 51 and the SW card 52. The position information generation unit 514 and the position information acquisition unit 508 are, for example, processes executed by the processor 54 of the control card 53 executing predetermined programs stored in the memory 55. The position information DB 515 is created, for example, in a storage area of the memory 55 of the control card 53.

The data reception unit 507 and the data transmission unit 503 are interfaces of data transmission and reception. The data reception unit 507 extracts the position confirmation request addressed to the relay device 5 or to another device from the data received by the relay device 5 and outputs the position confirmation request to the position information generation unit 514. The data reception unit 507 extracts the position confirmation request from the reception data based on, for example, the protocol number, the port number, or the like in the header of the packet.

The position information acquisition unit 508 acquires the position information of the relay device 5 and stores the position information in the position information DB 515. In the first embodiment, since it is designed to use the latitude/longitude obtained from the GPS as the position information, the position information acquisition unit 508 acquires the latitude/longitude from the GPS. For example, if the relay device 5 is a wireless station and uses, as the position information, the serial number of the base station to be connected, the position information acquisition unit 508 inquires the base station to acquire the serial number from the base station. The position information may be input by the manager of the relay device 5. When the position information is acquired from other devices, the position information acquisition unit 508 may update the position information at a predetermined period. Furthermore, the position information acquisition unit 508 reads the position information from the position information DB 515 when a reading instruction of the position information is received.

When the position confirmation request is input from the data reception unit 507, the position information generation unit 514 generates position information data in response to the position confirmation request. The position information data includes the IP address of the relay device 5 as a creator and the position information of the relay device 5. Furthermore, the position information generation unit 514 sets the source IP address of the position confirmation request as the destination IP address of the position information data. Furthermore, the position information generation unit 514 sets the destination IP address of the position confirmation request as the source IP address of the position information data. The position information generation unit 514 acquires the position information of the relay device 5 own from the position information DB 515 through the position information acquisition unit 508.

The position information generation unit 514 returns the generated position information data to the sender of the position confirmation request through the data transmission unit 503 and forwards the received position confirmation request to the destination of the position confirmation request.

<Flow of Process>

Figure 10:
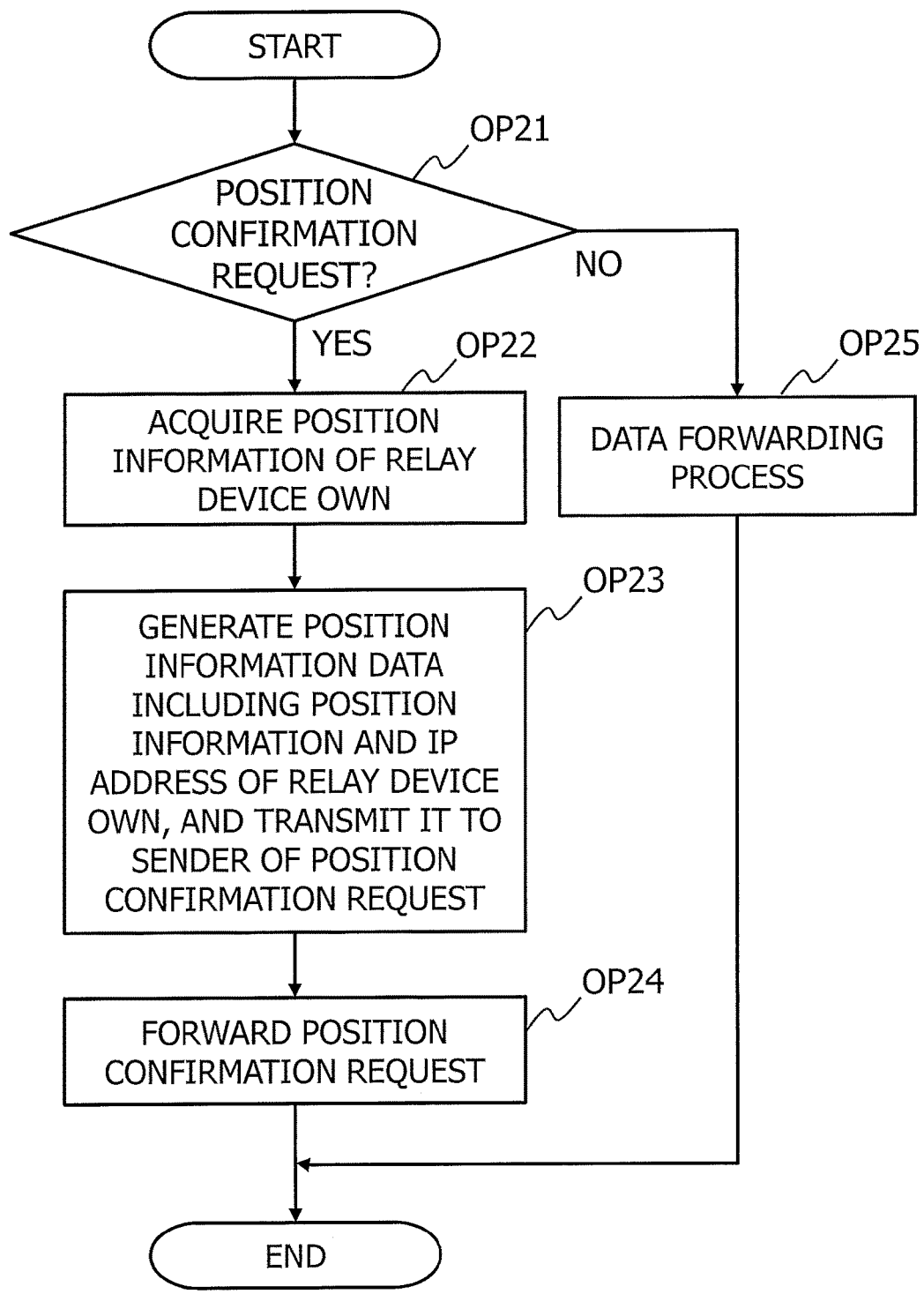
FIG. 10 is an example of a flow chart of a process of the relay device according to the first embodiment.

FIG. 10 is an example of a flow chart of a process of the relay device 5 according to the first embodiment. The flow chart illustrated in FIG. 10 is started when the relay device 5 receives data.

OP21 is a process by the data reception unit 507 extracting the position confirmation request from the reception data. If the position confirmation request is extracted (OP21: YES), the process proceeds to OP22. If data other than the position confirmation request is received (OP21: NO), the process proceeds to OP25, and the SW card 52 executes a normal forwarding process for the reception data. Subsequently, the process illustrated in FIG. 10 ends.

In OP22, the position information generation unit 514 acquires the position information from the position information DB 515 through the position information acquisition unit 508. Next, the process proceeds to OP23.

In OP23, the position information generation unit 514 generates position information data including the position information of the relay device 5 and the IP address of the relay device 5 as the IP address of the creator. The destination IP address of the position information data is the source IP address of the position confirmation request. The source IP address of the position information data is the destination IP address of the position confirmation request. The position information generation unit 514 transmits the position information data to the sender of the position confirmation request through the data transmission unit 503. Next, the process proceeds to OP24.

In OP24, the position information generation unit 514 forwards the position confirmation request to the destination through the data transmission unit 503. Subsequently, the process illustrated in FIG. 10 ends.

The process illustrated in FIG. 10 is an example, and the order may be appropriately switched, omitted, or added.

<Effects of First Embodiment>

In the first embodiment, the information processing device 1 acquires the country information of the devices existing on the path to the destination of the data to be transmitted and determines the presence of a country on the path in which passing of data is prohibited. The information processing device 1 transmits the data to be transmitted to the destination if there is no country on the path in which passing of data is prohibited and discards the data to be transmitted if there is a country on the path in which passing of data is prohibited. As a result, the concept as in the physical distribution is applied in the transmission and reception of data using a network, and transmission of data passing through a country in which passing of data is prohibited can be controlled.

An example of a method for specifying the position of the relay device includes a technique, called GEO-IP, of specifying the position from the IP address of the device. In the GEO-IP, there is a misjudgment, such as, for example, the position of the relay device 5 specified by the GEO-IP is the country B, although the actual position of the relay device 5 is the country A. The accuracy of specifying the position is low in the GEO-IP, and the GEO-IP lacks credibility. On the other hand, in the first embodiment, the information processing device 1 acquires the position information from the devices on the path, through which the data to be transmitted is to be passed, and acquires the country information from the position information. Therefore, the countries of the devices on the path can be more accurately specified.

In the first embodiment, the information processing device 1 discards the data if there is a country on the path in which passing of data is prohibited. However, the process of the information processing device 1 when there is a country on the path in which passing of data is prohibited is not limited to this, and for example, the information processing device 1 may change the used carrier, default gateway, and the like to prompt the implementation of research of the path of the relay devices 5. Or, for example, the information processing device 1 may transmit a query of path research to a higher relay device 5 to prompt the implementation of research of the path. When the path to the destination of the data to be transmitted is updated by the implementation of research of the path by the relay device 5, the information processing device 1 executes, for the new path, the process of determining whether a country in which passing of data is prohibited is included, which is described in the first embodiment.

<Second Embodiment>

Figure 11:
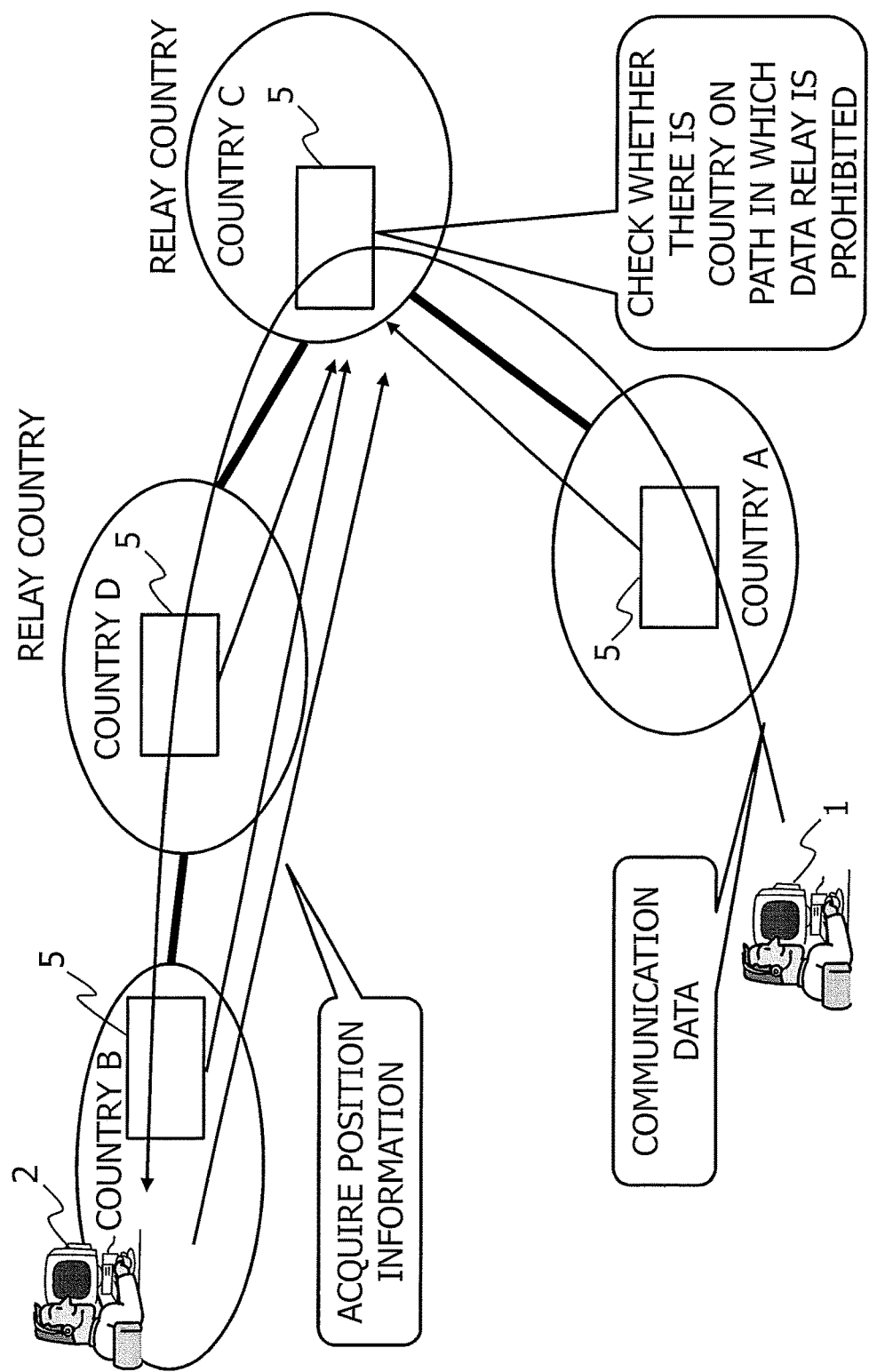
FIG. 11 is a diagram illustrating an example of a network system according to a second embodiment.

FIG. 11 is a diagram illustrating an example of a network system according to a second embodiment. The configuration of the network system illustrated in FIG. 11 is the same as that of the network system illustrated in FIG. 1.

In the second embodiment, the relay device 5 executes the process in the first embodiment executed by the information processing device 1 that is the sender of data. Since the relay device 5 is an device that relays data, the relay device 5 executes the process of determining whether a country in which passing of data is prohibited is included in the path from the information processing device 1 as the sender to the relay device 5, in addition to the path from the relay device 5 to the information processing device 2 as the destination of the data to be transmitted.

For example, in FIG. 11, when data is transmitted from the information processing device 1 to the information processing device 2, the relay device 5 of the country C that relays the data determines whether a country, for which the country C prohibits passing of data, is included on the path of the data relayed by the relay device 5. More specifically, the relay device 5 of the country C collects the position information from the devices on the path from the relay device 5 to the information processing device 2 and from the devices on the path from the information processing device 1 to the relay device 5 and determines whether a country, for which the country C prohibits passing of data, is included in the two paths.

In the second embodiment, the description common to the first embodiment is omitted. The hardware configuration of the relay device 5 is the same as that of the first embodiment and is as illustrated in FIG. 8. However, in the second embodiment, a relay control program is stored in the memory 55 of the control card 53. The relay control program is a program for controlling the relay of data by determining whether a country in which passing of data is prohibited is included on the path of the data relayed by the relay device 5.

Figure 12:
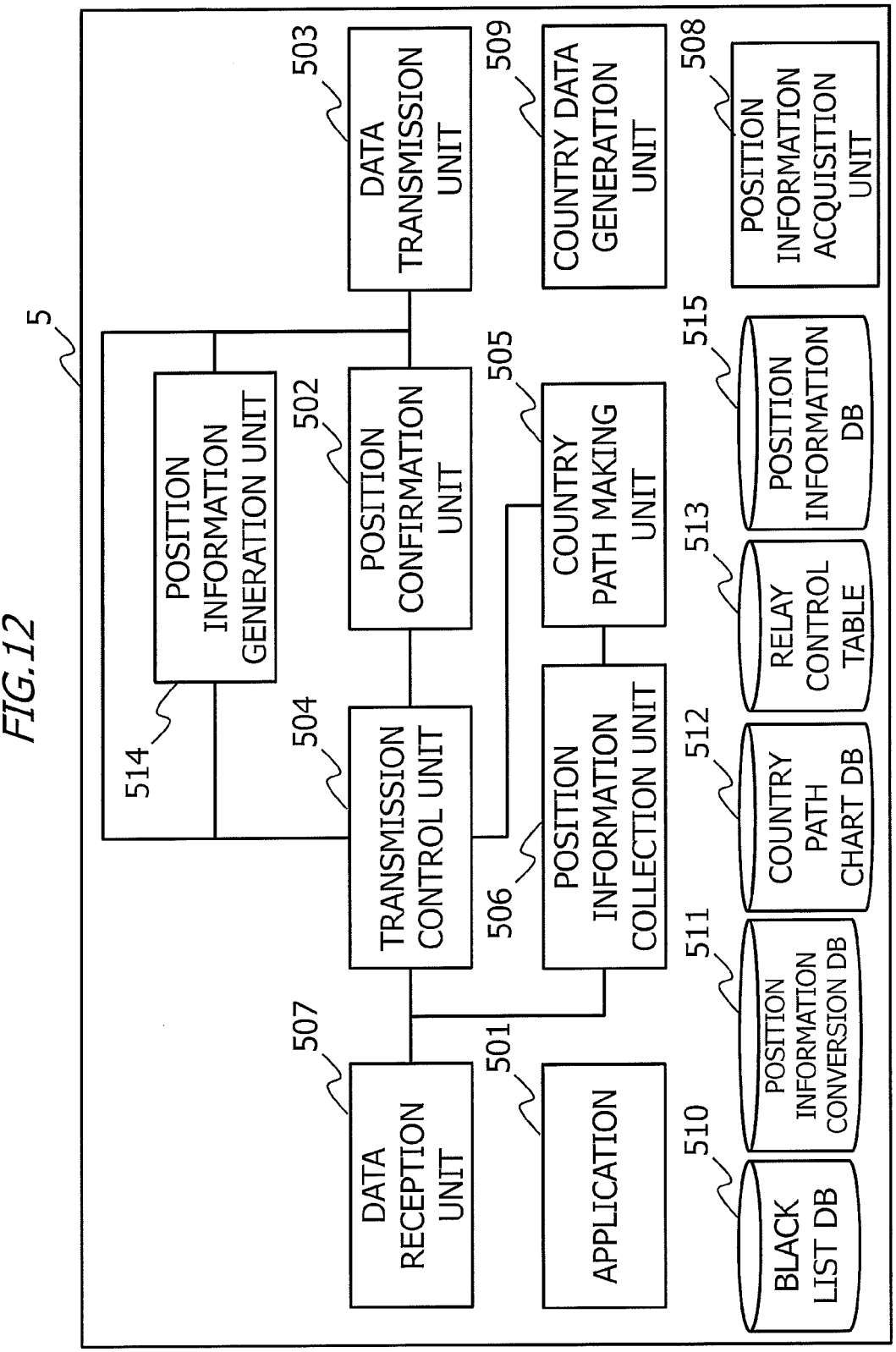
FIG. 12 is an example of a functional block diagram of the relay device according to the second embodiment.

FIG. 12 is an example of a functional block diagram of the relay device 5 according to the second embodiment. The relay device 5 includes functional blocks, such as a position confirmation unit 502, the data transmission unit 503, a transmission control unit 504, a country path making unit 505, a position information collection unit 506, the data reception unit 507, the position information acquisition unit 508, a position information generation unit 514, a black list DB 510, a position information conversion DB 511, a country path chart DB 512, a relay control table 513, and the position information DB 515. A country data generation unit 509 does not operate in the second embodiment and will be described in a third embodiment described later.

The data reception unit 507 and the data transmission unit 503 are equivalent to the IF card 51 and the SW card 52. The position confirmation unit 502, the transmission control unit 504, the country path making unit 505, the position information collection unit 506, the position information acquisition unit 508, and the position information generation unit 514 are a process executed by the processor 54 of the control card 53 executing the relay control program stored in the memory 55. The black list DB 510, the position information conversion DB 511, the country path chart DB 512, the relay control table 513, and the position information DB 515 are statically generated in advance or generated through the execution of a program in the storage area of the memory 55 of the control card 53, for example.

In the second embodiment, the data reception unit 507 outputs all reception data including the position confirmation request to the transmission control unit 504. In addition to the processes of the transmission control unit 14 and the position confirmation unit 12 of the information processing device 1 of the first embodiment respectively, the transmission control unit 504 and the position confirmation unit 502 execute the determination process for the path from the sender of the reception data to the relay device 5, wherein the determination process is the same as for the path from the relay device 5 to the destination of the reception data.

The country path making unit 505 and the position information collection unit 506 execute the same processes as those of the country path making unit 15 and the position information collection unit 16 of the information processing device of the first embodiment, respectively. The black list DB 510, the position information conversion DB 511, and the country path chart DB 512 are the same as the black list DB 18, the position information conversion DB 19, and the country path chart DB 20 of the information processing device 1 of the first embodiment. However, the black list of the relay device 5 is a list of countries for which the country of the relay device 5 prohibits relaying of data by the relay devices 5. More specifically, the black list of the relay device 5 includes: countries prohibited, by the country of the relay device 5, to be the country of the destination of the data from the country of the relay device 5 or to be the countries of the relay devices from the country of the relay device 5 to the destination; and countries prohibited to be the country of the sender of the data received by the relay device 5 or to be the countries of the relay devices from the sender to the relay device 5.

The data transmission unit 503, the position information acquisition unit 508, the position information generation unit 514, and the position information DB 515 are the same as those of the first embodiment. The relay control table 513 is a table for storing the results of the availability determination of the relay of data, by the transmission control unit 504, from the sender or to the destination of the reception data. The record of the relay control table 513 is deleted when a predetermined time has passed from the record registration.

The position information acquisition unit 508, the position information generation unit 514, and the position information DB 515 execute the same processes as those of the first embodiment. The position information acquisition unit 508 is an example of the "collection unit". The transmission control unit 504 is an example of the "determination unit" and the "transmission unit". The country path making unit 505 is an example of the "acquisition unit". The data reception unit 507 is an example of the "reception unit". The black list DB 510 is an example of the "storage unit". The relay control table 513 is an example of the "holding unit". The position information conversion DB 511 is an example of the "correspondence storage unit".

In the second embodiment, the process executed by the relay device 5 is specifically as follows. The transmission control unit 504 determines the availability of the relay for the destination and the sender of the reception data. If the determination result of the relay availability for the destination and the sender of the reception data is not stored in the relay control table 513, the transmission control unit 504 instructs the position confirmation unit 502 to transmit the position confirmation request. In response to the instruction from the transmission control unit 504, the position confirmation unit 502 transmits the position confirmation request to the destination and the sender of the reception data.

For the path from the relay device 5 to the destination of the reception data and the path from the sender of the reception data to the relay device 5, the position information collection unit 506 collects the position information data from the devices on the paths, and the country path making unit 505 makes the country path chart to acquire the countries in which the reception data goes through. The transmission control unit 504 permits the relay of the reception data if there is no country included in the black list on the path from the relay device 5 to the destination of the reception data and on the path from the sender of the reception data to the relay device 5 and prohibits the relay of the reception data if there is a country included in the black list.

In the second embodiment, at the transmission of the position confirmation request generated by the relay device 5 and at the reception of the position information data with the relay device 5 as the destination, which is a response to the position confirmation request, the availability determination of the relay (transmission and reception) is not performed due to the nature of acquiring the position information of the devices on the path. This is because if the process of confirming the countries on the path is also executed for the position confirmation request and the position information data, there is a possibility that the process loops, thereby imposing a load on the relay device 5 and the network. However, if the position confirmation request transmitted from an device other than the relay device 5 and the position information data with an device other than the relay device 5 as the destination are received, the relay device 5 performs the availability determination of the relay.

Figure 13B:
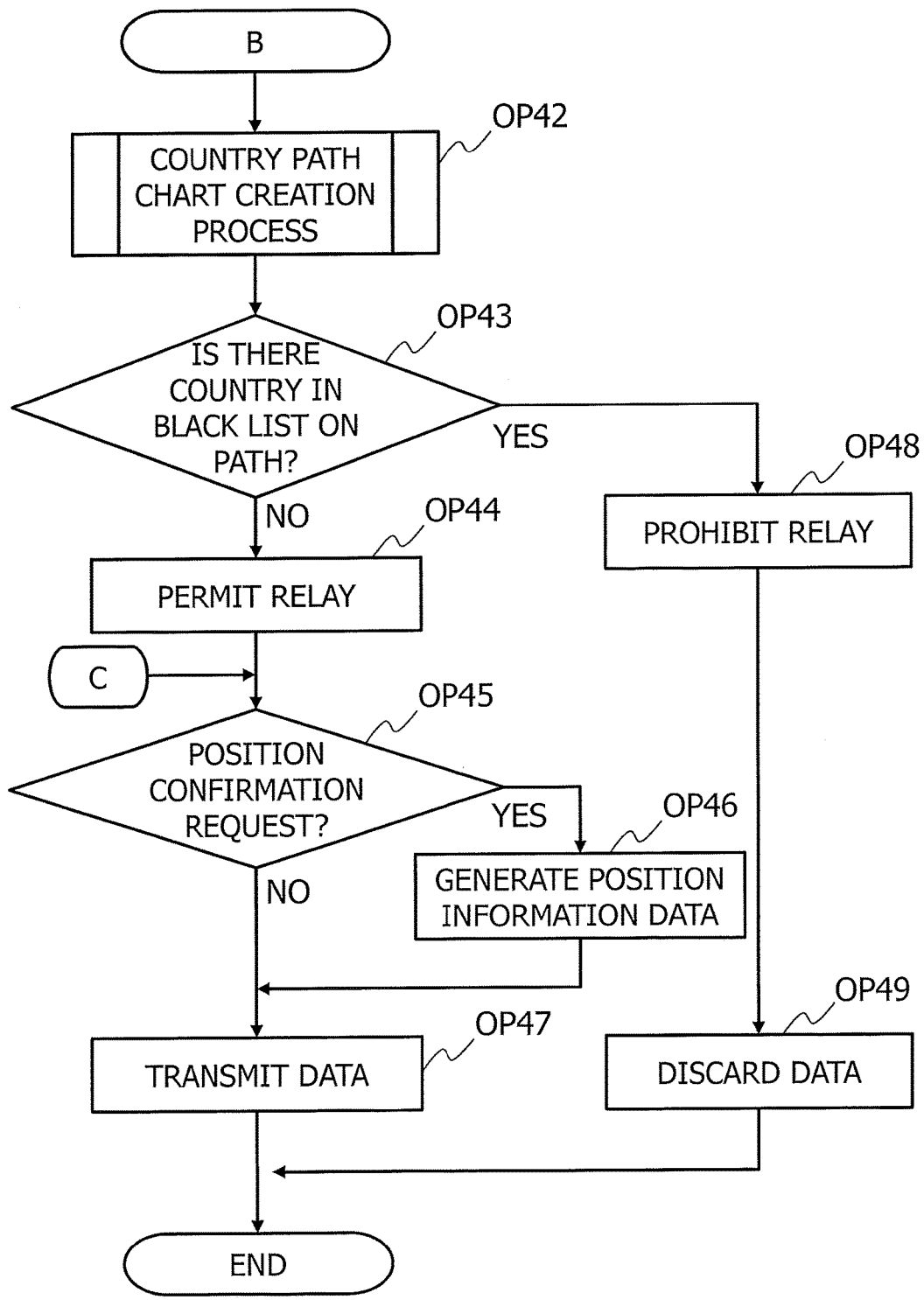
FIG. 13B is an example of a flow chart of a process of the relay device according to the second embodiment.

<Flow of Process>
FIGS. 13A and 13B are an example of a flow chart of a process of the relay device 5 according to the second embodiment. The flow chart illustrated in FIGS. 13A and 13B is started when, for example, the relay device 5 receives data.

OP31 is a process by the position information collection unit 506 extracting the position information data addressed to the relay device 5 from the reception data input from the data reception unit 507. The position information data extracted in OP31 is position information data in which the destination IP address is the IP address indicating the relay device 5, and the data indicates that the protocol number or the port number in the header is the position information data. If the position information data addressed to the relay device 5 is received (OP31: YES), the position information collection unit 506 outputs the position information data to the country path making unit 505, and the process proceeds to OP42. If the reception data is other than the position information data addressed to the relay device 5 (OP31: NO), the process proceeds to OP32.

OP32 to OP35 and OP38 are a process by the transmission control unit 504 determining whether the result of the relay availability determination is stored in the relay control table 513, for the destination and the sender of the reception data. If the result of the relay availability determination is stored in the relay control table 513, the process of collecting the position information data to determine the availability of the relay is skipped for one or both of the path from the relay device 5 to the destination of the reception data and the path from the sender of the reception data to the relay device 5.

If the destination of the reception data is set to relay-prohibited in the relay control table 513 (OP32: YES) and if the sender of the reception data is set to replay-prohibited in the relay control table 513 (OP33: YES), the process proceeds to OP41. In OP41, the transmission control unit 504 discards the reception data without forwarding the reception data.

If the destination and the sender of the reception data are set to relay-permitted in the relay control table 513 (OP34: YES, OP38: YES), the process proceeds to OP45 to OP47 that are a process of forwarding the reception data.

If the destination of the reception data is set to relay-permitted in the relay control table 513 (OP34: YES) and if the result of the relay availability determination for the sender of the reception data is not in the relay control table 513 (OP38: NO), the process proceeds to OP39. To collect the position information data for the path from the sender of the reception data to the relay device 5 and to perform the relay availability determination, the position confirmation unit 502 transmits the position confirmation request to the sender of the reception data in OP39. Subsequently, the process proceeds to OP42 that is a country path chart making process.

If the result of the relay availability determination for the destination of the reception data is not in the relay control table 513 (OP34: NO) and the sender of the reception data is set to relay-permitted in the relay control table 513 (OP35: YES), the process proceeds to OP37. To collect the position information data for the path from the relay device 5 to the destination of the reception data and to perform the relay availability determination, the position confirmation unit 502 transmits the position confirmation request to the destination of the reception data in OP37. Subsequently, the process proceeds to OP42 that is a country path chart making process.

If the result of the relay availability determination is not in the relay control table 513 for the destination and the sender of the reception data (OP35: NO), the process proceeds to OP36. To collect the position information data for the path from the relay device 5 to the destination of the reception data and for the path from the sender to the relay device 5 to perform the relay availability determination, the position confirmation unit 502 transmits the position confirmation request to the destination and the sender of the reception data in OP36. Subsequently, the process proceeds to OP42 that is a country path chart making process.

In OP42, the country path making unit 505 makes the country path chart in response to the reception of the position information data that is a response to the position confirmation request transmitted in the process of one of OP36, OP37, and OP39. The country path chart making process is as illustrated in FIG. 7. When the country path chart is made, the process proceeds to OP43. In the second embodiment, if the position confirmation request is transmitted to the destination and the sender of the reception data in OP36, two country path charts are made for the destination and the sender of the reception data in the country path chart making process of OP42.

However, the process is not limited to this, and one country path chart may be made for the destination and the sender of the reception data in OP36 when the position confirmation request is transmitted to the destination and the sender of the reception data. In this case, the country path chart is identified by the destination and the source IP address of the reception data. Furthermore, the country path making unit 505 determines the completion of the country path chart by the reception of the position information data, in which the IP address of the creator matches the destination IP address of the reception data, and the position information data, in which the IP address of the creator matches the source IP address of the reception data.

In OP43, the transmission control unit 504 compares the country path chart made in OP42 and the black list and determines whether there is a country included in the black list in the path from the relay device 5 to the destination of the reception data and/or in the path from the relay device 5 to the sender of the reception data. If there is no country included in the black list on any path (OP43: NO), the process proceeds to OP44, and the transmission control unit 504 determines the relay permission of the reception data. The transmission control unit 504 stores the relay permission in the relay control table 513, for the destination and/or the sender of the reception data. Next, the process proceeds to OP45.

In OP43, if there is a country included in the black list on any path (OP43: YES), the process proceeds to OP48, and the transmission control unit 504 determines the relay prohibition of the reception data in OP48. The transmission control unit 504 stores the relay prohibition in the relay control table 513, for the destination and/or the sender of the reception data. Next, the process proceeds to OP49, and since the reception data is relay-prohibited, the transmission control unit 504 discards the reception data. Consequently, the process illustrated in FIGS. 13A and 13B ends.

In OP45, the transmission control unit 504 determines whether the reception data determined to be relay-permitted in OP39 and OP44 is the position confirmation request. Whether the reception data is the position confirmation request from another device is determined by, for example, the protocol number, the port number, or the like of the header of the reception data. If the reception data is the position confirmation request from another device (OP45: YES), the process proceeds to OP46.

In OP46, the position information generation unit 514 generates the position information from the IP address and the position information of the relay device 5. Subsequently, the process proceeds to OP47, and in OP47, the position information data is returned, and the position confirmation request is forwarded. Subsequently, the process illustrated in FIGS. 13A and 13B ends. For the position information data, the process of FIGS. 13A and 13B may be implemented at the transmission. However, the destination of the position information data generated in OP46 is the sender of the position confirmation request. The relay permission is determined for the sender, and the determination result is stored in the relay control table 513. Therefore, transmission-permitted is set anyway.

In OP45, if the reception data is not the position confirmation request from another device (OP45: NO), the process proceeds to OP47. In OP47, the reception data is transmitted through the data transmission unit 503. Subsequently, the process illustrated in FIGS. 13A and 13B ends.

The process of FIGS. 13A and 13B is also executed when the application 501 included in the relay device 5 instructs the transmission of data, in addition to when the relay device 5 receives data. The relay device 5 is set in advance to relay-permitted in the relay control table 513. The process illustrated in FIGS. 13A and 13B is an example, and the order may be appropriately switched, omitted, or added.

<Effects of Second Embodiment>

In the second embodiment, the relay device 5 acquires the position information of the devices on the path from the sender of the reception data to the relay device 5 and on the path from the relay device 5 to the destination of the reception data, and whether a country in which passing of data is prohibited is included on the path is determined. The relay device 5 forwards the reception data if a country in which passing of data is prohibited is not included on both paths. Therefore, the relay device 5 can control forwarding of data going through the country for which the country of the relay device 5 prohibits passing of data.

The process of OP32 to OP35 and OP38 of determining whether the result of the relay availability determination is stored in the relay control table 513 for the destination and the sender of the reception data may be achieved by, for example, hardware, such as by achieving the relay control table 513 by a CAM (Content Addressable Memory).

In the second embodiment, although the relay device 5 performs the relay availability determination for the destination and the sender of the reception data, the process is not limited to this. The relay device 5 may perform the relay availability determination for one of them.

<Third Embodiment>

Figure 14:
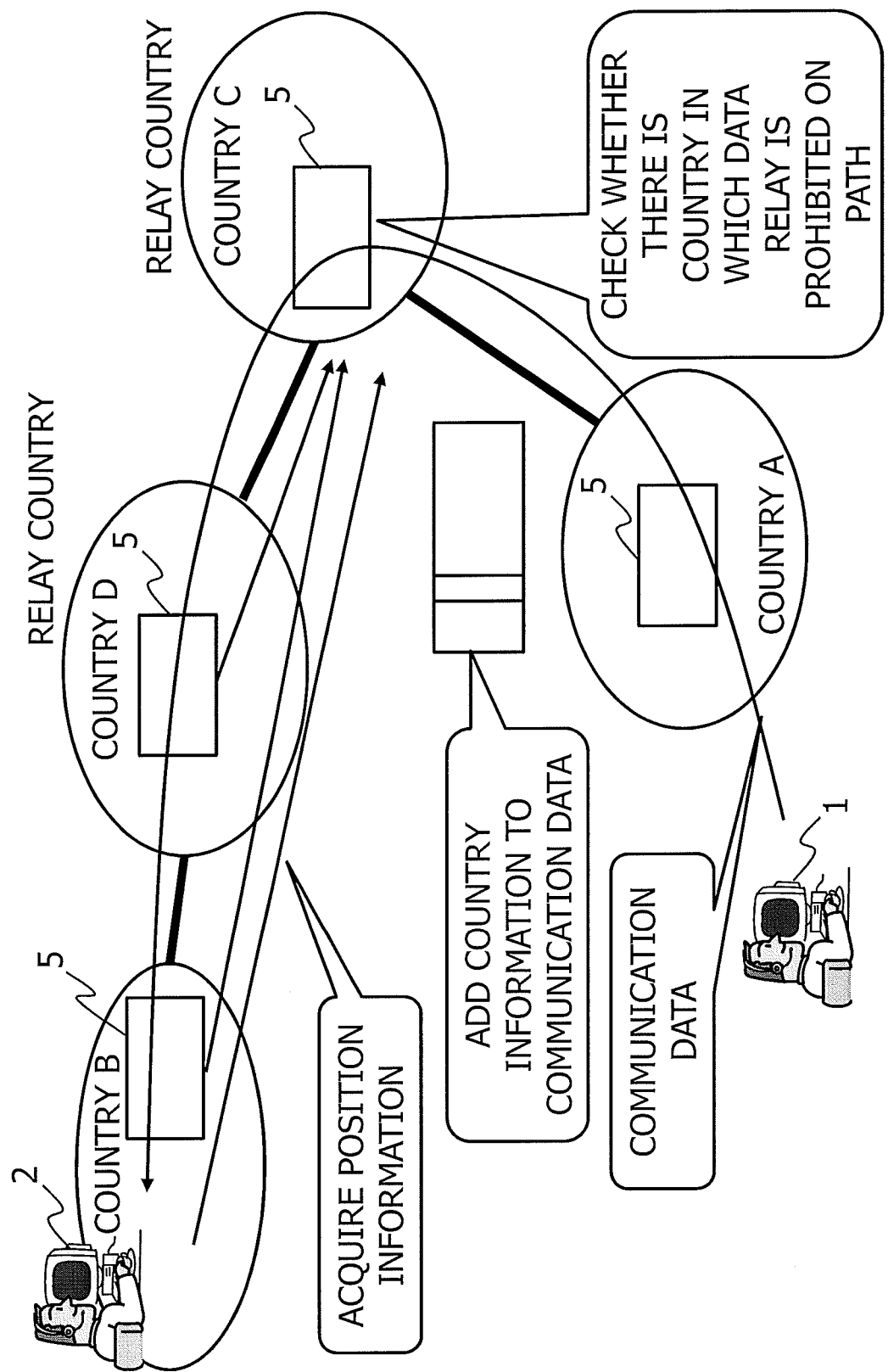
FIG. 14 is a diagram illustrating an example of a network system according to a third embodiment.

FIG. 14 is a diagram illustrating an example of a network system according to the third embodiment. The configuration of the network system illustrated in FIG. 14 is the same as that of the network systems illustrated in FIGS. 1 and 11.

In the third embodiment, the relay devices 5 and the information processing devices 1 and 2 in the network system hold information of the countries of the devices (hereinafter, "country information"), and the country information of the devices is added to the data at the relay or transmission of the data. As a result, the data received by the relay device 5 holds the information of the countries that the data has already gone through. As described in the second embodiment, each relay device 5 executes the determination process of whether a country in which passing of data is prohibited is included in the path, for the path from the relay device 5 to the destination of the reception data. Furthermore, in the third embodiment, the relay device 5 executes the determination process of whether a country in which passing of data is prohibited is included in the path from the sender of the reception data to the relay device 5 based on the country information added to the reception data.

For example, when data is transmitted from the information processing device 1 to the information processing device 2 in FIG. 14, the relay device 5 of the country C that relays the data determines whether a country for which the country C prohibits passing of data is included on the path of the data relayed by the relay device 5. To specify the countries on the path to the information processing device 2 that is the destination of the reception data, the relay device 5 of the country C transmits the position confirmation request to the information processing device 2. The relay device 5 of the country C collects the position information of the relay device 5 of the country D and the information processing device 2 of the country B positioned on the path to the information processing device 2, in response to the position confirmation request. The relay device 5 of the country C specifies that the country D and the country B exist on the path to the information processing device 2 based on the collected position information and determines whether the country D and the country B are countries for which the country C prohibits the relay of data.

Meanwhile, for the countries on the path from the information processing device 1 that is the sender of the reception data to the relay device 5 of the country C, the relay device 5 of the country A and the information processing device 1 add the country information of the country A to the reception data. Therefore, the relay device 5 of the country C specifies that the country A exists on the path from the information processing device 1 to the relay device 5 of the country C, that is, the reception data came through the country A, based on the country information added to the reception data. The relay device 5 of the country C determines whether the country A is a country for which the country C prohibits the relay of data.

Subsequently, as in the second embodiment, the relay device 5 of the country C does not relay the reception data if a country in which the relay of data is prohibited is included on the path to the information processing device 2 that is the destination of the reception data and on the path from the information processing device 1 that is the sender of the reception data to the relay device 5 of the country C. If a country in which the relay of data is prohibited is not included on the path to the information processing device 2 that is the destination of the reception data and on the path from the information processing device 1 that is the sender of the reception data to the relay device 5 of the country C, the relay device 5 of the country C relays the reception data.

In the third embodiment, the description common to the first embodiment and the second embodiment is omitted. The hardware configuration of the relay device 5 is the same as that of the first embodiment and is as illustrated in FIG. 8.

In the third embodiment, the functional blocks of the relay device 5 are as illustrated in FIG. 12. The country data generation unit 509 uses the position information conversion DB 511 to acquire the information of the country of the relay device 5 from the position information of the relay device 5 acquired by the position information acquisition unit 508. In the third embodiment, it is assumed that a code indicated by two letters of the alphabet is used for the country information provided to the reception data, for example. Therefore, the country data generation unit 509 uses a predetermined code conversion table (not illustrated, stored in the memory 55) to acquire the country code corresponding to the acquired country information of the relay device 5 and stores the country code in the position information DB 515. The position information acquisition unit 508 and the country data generation unit 509 may update the position information and the country code of the relay device 5 at a predetermined period.

In the third embodiment, the transmission control unit 504 executes the process for the path from the relay device 5 to the destination of the reception data as in the second embodiment. On the other hand, for the path from the sender of the reception data to the relay device 5, the transmission control unit 504 specifies the countries existing on the path based on the country codes provided to the reception data. In the third embodiment, for the sender of the reception data, the transmission control unit 504 does not store the result of the availability determination of the relay in the relay control table 513 and does not perform the relay availability determination based on the relay control table 513 at the reception of the reception data.

In the third embodiment, the transmission control unit 504 attaches the country code of the relay device 5 to the data before transmitting the data. The country code is stored in, for example, one of the undefined fields in the header of the packet. Furthermore, if the country code is already attached to the data by another device, the transmission control unit 504 stores the country code of the relay device 5 at the tail end.

In the third embodiment, the position information collection unit 506 also executes a process of extracting the country code from the reception data to transmit the country code to the country path making unit 505 in addition to a process of extracting the position information data addressed to the relay device 5 from the reception data to transmit the position information data to the country path making unit 505.

In the third embodiment, the availability determination of the relay (transmission and reception) is not performed for the position confirmation request created and transmitted by the relay device 5 itself and for the position information data with the relay device 5 itself as the destination, which is a response to the position confirmation request.

In the third embodiment, the information processing device 1 that is the sender of the data executes the processes of the transmission control unit 504, the data transmission unit 503, the position information acquisition unit 508, and the country data generation unit 509, for example. Specifically, if there is a transmission instruction of data from an application, the information processing device 1 provides the country code of the country of the information processing device 1 to the data and transmits the data.

<Flow of Process>

Figure 15A:
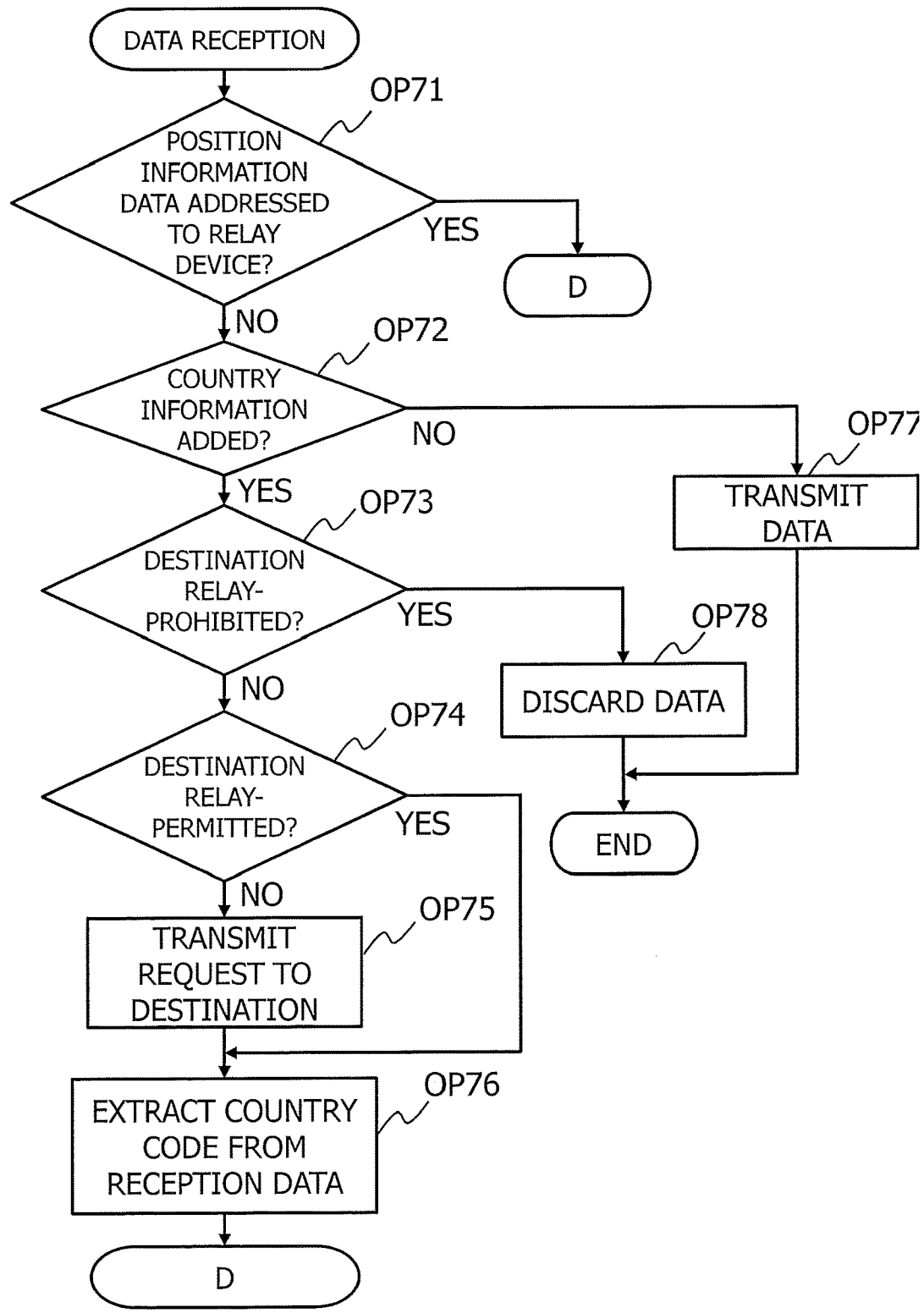
FIG. 15A is an example of a flow chart of a process of the relay device according to the third embodiment.
Figure 15B:
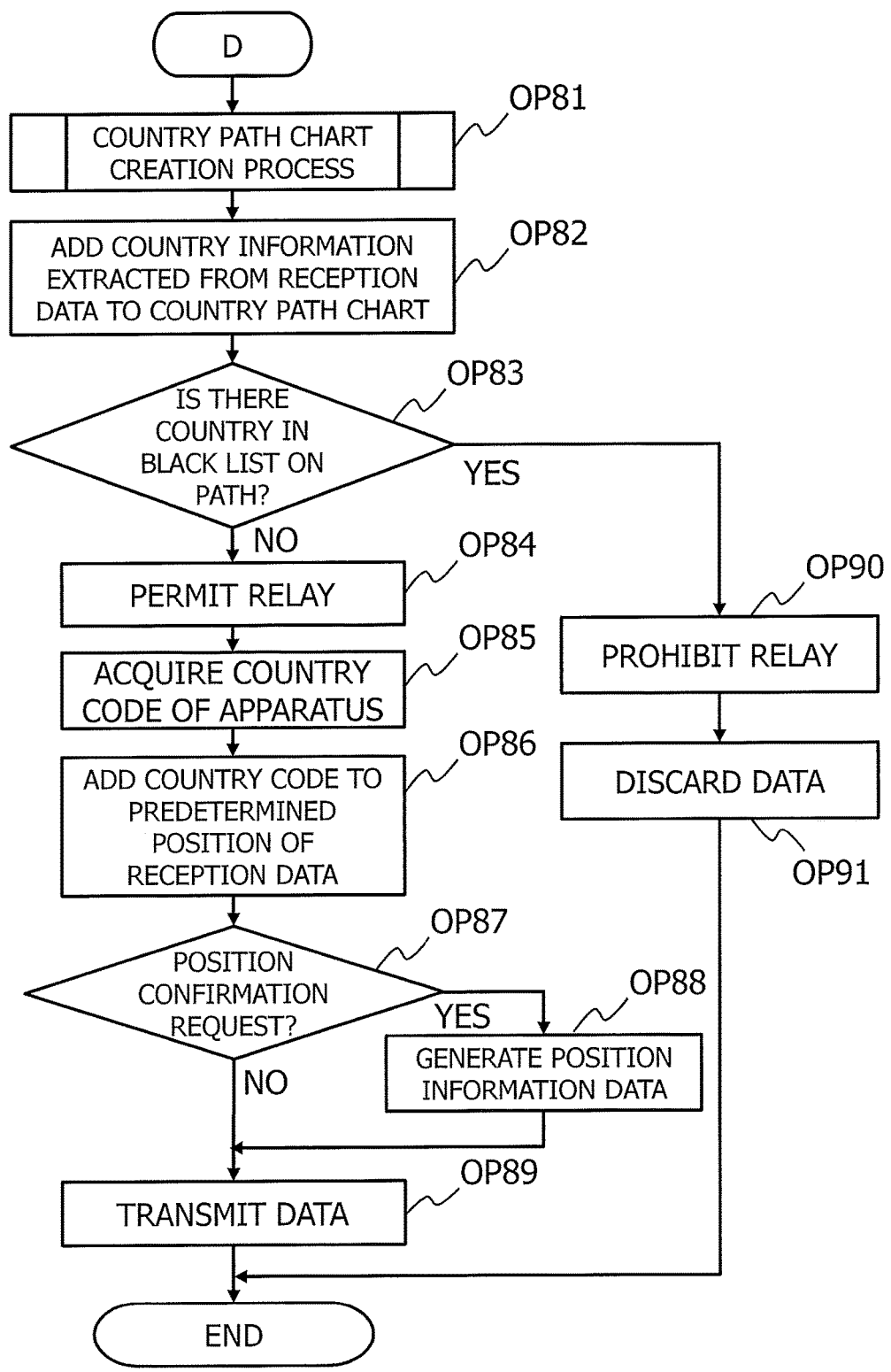
FIG. 15B is an example of a flow chart of a process of the relay device according to the third embodiment.

FIGS. 15A and 15B are an example of a flow chart of a process of the relay device 5 according to the third embodiment. The flow chart illustrated in FIGS. 15A and 15B is started when, for example, the relay device 5 receives data.

OP71 is a process by the position information collection unit 506 extracting the position information data addressed to the relay device 5 from the reception data input from the data reception unit 507. If the position information data addressed to the relay device 5 is received (OP71: YES), the position information collection unit 506 outputs the position information data to the country path making unit 505, and the process proceeds to OP81. If the reception data is other than the position information data addressed to the relay device 5 (OP71: NO), the process proceeds to OP72.

In OP72, the transmission control unit 504 determines whether the country code is added to the reception data. If the country code is added to the country code (OP72: YES), the process proceeds to OP73. If the country code is not added to the reception data (OP72: NO), the process proceeds to OP77, and the transmission control unit 504 transmits the reception data through the data transmission unit 503.

OP73 and OP74 are a process of determining whether the result of the relay availability determination is stored in the relay control table 513, for the destination of the reception data. If the destination of the reception data is set to relay-prohibited in the relay control table 513 (OP73: YES), the process proceeds to OP78. In OP78, the transmission control unit 504 discards the reception data without forwarding the reception data.

If the destination of the reception data is set to relay-permitted in the relay control table 513 (OP74: YES), the process proceeds to OP76. If the destination of the reception data is not set to relay-permitted or relay-prohibited in the relay control table 513 (OP73: NO, OP74: NO), the process proceeds to OP75. In OP75, to collect the position information data for the path from the relay device 5 to the destination of the reception data to perform the relay availability determination, the position confirmation unit 502 transmits the position confirmation request to the destination of the reception data. Subsequently, the process proceeds to OP76.

In OP76, the position information collection unit 506 extracts the country code provided to the reception data. Next, the process proceeds to OP81.

In OP81, the country path making unit 505 creates the country path chart based on the reception of the position information data that is a response to the position confirmation request transmitted in OP75. The country path chart making process is as illustrated in FIG. 7. When the country path chart is made, the process proceeds to OP82.

In OP82, the country path making unit 505 converts the country code extracted from the reception data in OP76 to the country information and adds the country information to the country path chart made in OP81. Since information (position information) other than the country code is not obtained from the reception data, the fields of the IP address and the GPS latitude/longitude of the creator of the record including the country code extracted from the reception data remain blank in the example of the country path chart illustrated in FIG. 5, for example.

If the position confirmation request is not transmitted to the destination of the reception data and the country path chart is not made in OP81, the country path making unit 505 makes the country path chart corresponding to the destination of the reception data in OP82. Next, the process proceeds to OP83.

In OP83, the transmission control unit 504 compares the country path chart made in OP81 and OP82 and the black list to determine whether there is a country included in the black list in the path from the relay device 5 to the destination of the reception data and/or in the path from the relay device 5 to the sender of the reception data. If there is no country included in the black list on any path (OP83: NO), the process proceeds to OP84, and the transmission control unit 504 determines the relay permission of the reception data. The transmission control unit 504 stores the relay permission in the relay control table 513, for the destination of the reception data. Next, the process proceeds to OP85.

In OP83, if there is a country included in the black list on any path (OP83: YES), the process proceeds to OP90, and the transmission control unit 504 determines the relay prohibition of the reception data. The transmission control unit 504 stores the relay prohibition in the relay control table 513, for the destination of the reception data. Next, the process proceeds to OP91, and since the reception data is relay-prohibited, the transmission control unit 504 discards the reception data. Consequently, the process illustrated in FIGS. 15A and 15B ends.

OP85 and OP86 are a process for adding the country code of the relay device 5 to the reception data. In OP85, the transmission control unit 504 acquires the country code of the relay device 5 from the position information DB 515. Next, the process proceeds to OP86.

In OP86, the transmission control unit 504 adds the country code of the relay device 5 own to a predetermined position of the reception data. Next, the process proceeds to OP87.

OP87 and OP88 are a process when the reception data is the position confirmation request. In OP87, the transmission control unit 504 determines whether the reception data determined to be relay-permitted in OP84 is the position confirmation request. Whether the reception data is the position confirmation request from another device is determined by, for example, the protocol number, the port number, or the like of the header of the reception data. If the reception data is the position confirmation request from another device (OP87: YES), the process proceeds to OP88.

In OP88, the position information generation unit 514 generates the position information data from the IP address and the position information of the relay device 5. Subsequently, the process proceeds to OP89, and the position information data and the position confirmation request are forwarded in OP89. Subsequently, the process illustrated in FIGS. 15A and 15B ends.

In OP87, if the reception data is not the position confirmation request from another device (OP87: NO), the process proceeds to OP89. In OP89, the reception data is transmitted through the data transmission unit 503. Subsequently, the process illustrated in FIGS. 15A and 15B ends.

The process of FIGS. 15A and 15B is executed when the transmission of data is instructed from the application 501 included in the relay device 5, in addition to when the relay device 5 receives data. In this case, the processes other than OP76 and OP82 are executed.

The process illustrated in FIGS. 15A and 15B is an example, and the order may be appropriately switched, omitted, or added. For example, the order of the process of OP81 and OP82 may be opposite.

The information processing device 1 of the third embodiment executes the process of OP85, OP86, and OP89 at the data transmission. In the third embodiment, the information processing device 1 may execute the process of the first embodiment, in addition to the process of OP85, OP86, and OP89.

<Effects of Third Embodiment>

In the third embodiment, each device on the path attaches the country code of the device to the data. Thus, when the data is received, the relay device 5 can acquire, from the data, the information of the countries that the data has actually gone through from the sender to the relay device 5. Therefore, the accuracy of specifying the countries existing between the sender of the data and the relay device 5 is improved. As a result, according to the third embodiment, the accuracy of controlling the data relay going through the countries in which passing of data is prohibited can be improved.

In the third embodiment, the relay device 5 does not perform the relay availability determination using the relay control table 513, for the path from the sender of the reception data to the relay device 5. However, the process is not limited to this, and the relay device 5 may perform the relay availability determination using the relay control table 513, for the path from the sender of the reception data to the relay device 5.

In the third embodiment, although each device returns the position information data including the position information in response to the position confirmation request, in place of this, each device may return the position information data including the country code held by the device. In this case, the device of the sender of the position confirmation request can skip the process of acquiring the country information from the position information (FIG. 7, OP15). ※以下、US用定型文です。

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory, the processor configured to:
acquire one or a plurality of pieces of country information of one or a plurality of relay devices, the one or the plurality of relay devices being positioned on a path to a destination of data and relaying the data, the country information acquired from position information of the one or the plurality of relay devices;
compare the one or the plurality of pieces of the country information and information of countries in which passing of data is prohibited stored in the memory, the one or the plurality of pieces of the country information being of the one or plurality of relay devices being positioned on the path to the destination of the data;
determine whether each of the one or the plurality of relay devices positioned on the path to the destination of the data belongs to a country in which passing of data is prohibited; and
permit, when none of the one or the plurality of relay devices positioned on the path are belonging to a country in which passing of data is prohibited, transmission to the destination.

2. The information processing device according to claim 1, wherein the processor is configured to prohibit the transmission of the data to the destination when at least one of the one or the plurality of relay devices positioned on the path to the destination of the data belongs to a country in which passing of data is prohibited.

3. The information processing device according to claim 1, wherein the processor is configured to:
receive the data, and
acquire, as the path of the data to the destination, the country information of one or a plurality of relay devices positioned on the path to the destination of the data, for a path from a sender of the data to the information processing device and for a path from the information processing device to the destination.

4. The information processing device according to claim 1,
wherein the processor is configured to:
receive the data;
add, to the data, the country information of a country to which the information processing device belongs;
transmit the data to the destination;
determine whether a country in which passing of data is prohibited is included in the added country information when one or a plurality of pieces of country information are included in the received data; and
prohibit the transmission of the received data when a country in which passing of data is prohibited is included.

5. The information processing device according to claim 1, wherein the processor is configured to:
collect the position information of each relay device from the one or the plurality of relay devices positioned on the path; and
acquire the country information of the one or the plurality of relay devices from an association between the position information and the country information stored in the memory and from the collected position information of the one or the plurality of relay devices.

6. The information processing device according to claim 1, wherein the processor is configured to:
hold, for a predetermined time, a result of availability determination of the transmission of the data to the destination; and
determine, when the result of the availability determination of the transmission to the destination is held, permission of the transmission to the destination according to the held availability determination, without the acquisition of the country information.

7. An information processing method by an information processing device, the information processing method comprising:
acquiring one or a plurality of pieces of country information of one or a relay plurality of devices, the one or the plurality of relay devices being positioned on a path to a destination of data and relaying the data, the country information acquired from position information of the one or the plurality of relay devices;
comparing the one or the plurality of pieces of the country information and information of countries in which passing of data is prohibited stored in a memory, the one or the plurality of pieces of the country information being of the one or plurality of relay devices being positioned on the path to the destination of the data;
determining whether each of the one or the plurality of relay devices positioned on the path to the destination of the data belongs to a country in which passing of data is prohibited; and
permitting, when none of the one or the plurality of relay devices positioned on the path belonging to a country in which passing of data is prohibited, transmission to the destination.

8. A non-transitory computer-readable recording medium recording an information processing program for causing a computer to:
acquire one or a plurality of pieces of country information of one or a plurality of relay devices, the one or the plurality of relay devices being positioned on a path to a destination of data and relaying the data, acquired from position information of the one or the plurality of relay devices;

compare the one or the plurality of pieces of the country information and information of countries in which passing of data is prohibited stored in a memory, the one or the plurality of pieces of the country information being of the one or plurality of relay devices being positioned on the path to the destination of the data;

determine whether each of the one or the plurality of relay devices positioned on the path to the destination of the data belongs to a country in which passing of data is prohibited; and permit, when none of the one or the plurality of relay devices positioned on the path are belonging to a country in which passing of data is prohibited, transmission to the destination.

* * * * *